United States Patent
Fang

(10) Patent No.: US 10,980,057 B2
(45) Date of Patent: *Apr. 13, 2021

(54) SLOTTED OFDMA BASED CHANNEL ACCESS

(71) Applicants: ZTE Corporation, Guangdong (CN); Yonggang Fang, San Diego, CA (US)

(72) Inventor: Yonggang Fang, San Diego, CA (US)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/462,206

(22) PCT Filed: Nov. 17, 2017

(86) PCT No.: PCT/US2017/062415
§ 371 (c)(1),
(2) Date: May 17, 2019

(87) PCT Pub. No.: WO2018/094279
PCT Pub. Date: May 24, 2018

(65) Prior Publication Data
US 2019/0289633 A1    Sep. 19, 2019

Related U.S. Application Data

(60) Provisional application No. 62/423,659, filed on Nov. 17, 2016.

(51) Int. Cl.
*H04W 4/00*     (2018.01)
*H04W 74/00*    (2009.01)
(Continued)

(52) U.S. Cl.
CPC ....... *H04W 74/006* (2013.01); *H04L 27/2601* (2013.01); *H04W 74/0833* (2013.01)

(58) Field of Classification Search
CPC ....... H04L 1/18; H04L 1/1864; H04L 1/1896; H04L 5/0007; H04L 5/0055; H04L 27/26;
(Continued)

(56) References Cited

U.S. PATENT DOCUMENTS 7,068,632 B1   6/2006   Ho et al.
7,499,425 B2   3/2009   Yew et al.
(Continued)

FOREIGN PATENT DOCUMENTS

CN    1941666 A     4/2007
CN    101159648 A   4/2008
(Continued)

OTHER PUBLICATIONS

Ghosh et al, UL OFDMA-based Random Access Procedure, IEEE, 19 pages, Sep. 2015.*

(Continued)

*Primary Examiner* — Frank Duong
(74) *Attorney, Agent, or Firm* — Perkins Coie LLP

(57) ABSTRACT

Access to a wireless medium is controlled based on contention arbitration. A certain number of wireless devices are allowed by an access point to contend for a transmission opportunity. A trigger frame is used to communicate access opportunities to multiple devices. A beacon transmission may additionally be used for communication of access opportunities.

29 Claims, 15 Drawing Sheets

(51) Int. Cl.
*H04L 27/26* (2006.01)
*H04W 74/08* (2009.01)

(58) Field of Classification Search
CPC .. H04L 27/2601; H04W 48/02; H04W 48/16; H04W 72/04; H04W 72/0446; H04W 72/002; H04W 74/006; H04W 74/08; H04W 74/0833; H04W 74/0858; H04W 84/12
See application file for complete search history.

(56) References Cited

U.S. PATENT DOCUMENTS

| | | | |
|---|---|---|---|
| 9,641,234 B2* | 5/2017 | Moon | H04B 7/0621 |
| 9,693,367 B2 | 6/2017 | Fang et al. | |
| 9,949,290 B2* | 4/2018 | Seok | H04B 7/0452 |
| 9,967,877 B2* | 5/2018 | Seok | H04W 72/0446 |
| 10,116,360 B2* | 10/2018 | Seok | H04W 74/0816 |
| 10,129,001 B2* | 11/2018 | Seok | H04L 5/0055 |
| 10,271,353 B2* | 4/2019 | Zhou | H04W 72/121 |
| 10,284,287 B2* | 5/2019 | Kim | H04L 5/0037 |
| 10,313,082 B2* | 6/2019 | Kim | H04L 1/16 |
| 10,341,075 B2* | 7/2019 | Kim | H04L 5/0055 |
| 10,368,358 B2* | 7/2019 | Adachi | H04W 72/085 |
| 10,411,850 B2* | 9/2019 | Noh | H04W 74/0816 |
| 10,477,589 B2* | 11/2019 | Ahn | H04W 74/0833 |
| 10,660,129 B2* | 5/2020 | Nezou | H04W 74/0816 |
| 2003/0161340 A1 | 8/2003 | Sherman | |
| 2003/0198244 A1 | 10/2003 | Ho et al. | |
| 2008/0112351 A1 | 5/2008 | Surineni et al. | |
| 2011/0268054 A1 | 11/2011 | Abraham et al. | |
| 2013/0170480 A1 | 7/2013 | Novak et al. | |
| 2013/0286959 A1 | 10/2013 | Lou et al. | |
| 2014/0119288 A1 | 5/2014 | Zhu et al. | |
| 2015/0063258 A1 | 3/2015 | Merlin et al. | |
| 2015/0071051 A1 | 3/2015 | Zhu et al. | |
| 2015/0078230 A1 | 3/2015 | Choi et al. | |
| 2015/0201434 A1 | 7/2015 | Fang et al. | |
| 2016/0143010 A1 | 5/2016 | Kenney et al. | |
| 2016/0157266 A1 | 6/2016 | Wang et al. | |
| 2016/0262185 A1 | 9/2016 | Ghosh et al. | |
| 2016/0278081 A1 | 9/2016 | Chun et al. | |
| 2016/0286548 A1 | 9/2016 | Huang et al. | |
| 2016/0360443 A1 | 12/2016 | Hedayat | |
| 2017/0150493 A1 | 5/2017 | Seok | |
| 2017/0347372 A1 | 11/2017 | Li et al. | |
| 2017/0373736 A1 | 12/2017 | Fang | |
| 2018/0014316 A1 | 1/2018 | Guo et al. | |
| 2018/0020372 A1* | 1/2018 | Viger | H04W 28/0278 |
| 2018/0020373 A1* | 1/2018 | Viger | H04W 74/0816 |
| 2018/0027608 A1 | 1/2018 | Oh et al. | |
| 2018/0035488 A1 | 2/2018 | Yang et al. | |
| 2018/0084605 A1 | 3/2018 | Li et al. | |
| 2018/0167882 A1 | 6/2018 | Choi et al. | |
| 2018/0191541 A1 | 7/2018 | Fang et al. | |
| 2018/0263047 A1 | 9/2018 | Kim et al. | |

FOREIGN PATENT DOCUMENTS

| | | |
|---|---|---|
| CN | 101548573 A | 9/2009 |
| CN | 101600234 A | 12/2009 |
| CN | 102792755 A | 11/2012 |
| CN | 104320859 A | 1/2015 |
| CN | 104780618 A | 7/2015 |
| WO | 2015068968 A1 | 5/2015 |
| WO | 2015074461 A1 | 5/2015 |
| WO | 2016127913 A1 | 8/2016 |
| WO | 2016163641 A1 | 10/2016 |
| WO | 2016210389 A1 | 12/2016 |
| WO | 2017220024 A1 | 12/2017 |

OTHER PUBLICATIONS

Ghosh et al, Random Access with Trigger Frames using OFDMA, IEEE, 16 pages, Jul. 2015.*
International Search Report and Written Opinion dated May 28, 2018 for International Application No. PCT/US2017/062415, filed on Nov. 17, 2017 (13 pages).
International Search Report and Written Opinion dated Oct. 12, 2016 for International Application No. PCT/US2016/039449, filed on Jun. 25, 2016 (10 pages).
International Search Report and Written Opinion dated Sep. 14, 2017 for International Application No. PCT/CN2017/089796, filed on Jun. 23, 2017 (8 pages).
SIPO First Office Action for Chinese Application No. 201780052056. 3, dated Feb. 25, 2020 with English machine translation.
SIPO First Office Action with Search Report for Chinese Application No. 201510015319.6, dated Sep. 30, 2017, with English machine translation.
SIPO Second Office Action with Search Report for Chinese Application No. 201510015319.6, dated Mar. 8, 2018 (no English translation available).
SIPO Third Office Action for Chinese Application No. 201510015319. 6, dated Sep. 14, 2018, with English machine translation.
USPTO Non-Final Office Action for U.S. Appl. No. 14/596,150, dated Nov. 4, 2016, 25 pages.
USPTO Non-Final Office Action for U.S. Appl. No. 15/739,676, dated Jul. 16, 2019 (50 pages).
USPTO Notice of Allowance for U.S. Appl. No. 14/596,150, dated Mar. 1, 2017, 29 pages.
USPTO Notice of Allowance for U.S. Appl. No. 15/630,874, dated Apr. 3, 2019, 18 pages.
USPTO Notice of Allowance for U.S. Appl. No. 15/739,676, dated Oct. 29, 2019 (22 pages).

* cited by examiner

SLOTTED OFDMA BASED CHANNEL ACCESS

CROSS REFERENCE TO RELATED APPLICATIONS

This patent document claims the benefit of priority U.S. Provisional Patent Application No. 62/423,659, filed on Nov. 17, 2016. The entire content of the before-mentioned patent application is incorporated by reference as part of the disclosure of this document.

TECHNICAL FIELD

This patent document relates to wireless communication, and in particular, access to a wireless transmission medium by multiple wireless devices.

BACKGROUND

Wireless communication systems can include a network of one or more access points (AP) to communicate with one or more wireless stations (STA). An access point can emit radio signals that carry management information, control information, or users' data to one or more wireless stations, and a station can also transmit radio signals to the access point in the same frequency channel via time division duplexing (TDD) or in different frequency via frequency division duplexing (FDD).

IEEE 802.11 is an asynchronous time division duplexing technology designated for wireless local area network (WLAN). The basic unit of WLAN is a basic service set (BSS). The infrastructure BSS is the BSS with stations through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies, among other things, slotted orthogonal frequency-division multiple access (SOFDMA) channel access mechanism to improve the medium usage efficiency and reduce access latency in wireless communications.

In one aspect, a method is provided to commence the SOFDMA channel access process via transmitting a trigger frame with indication of channel access transmission opportunity (CA-TXOP) and setting the duration of TXOP to protect SOFDMA procedure from being interfered by other stations.

In another aspect, a method is provided for the AP to configure the periodical trigger frame transmission time in the broadcast beacon frame so that the SOFDMA capable stations are able to use the SOFDMA channel access transmission opportunity.

In another aspect, a method is provided for stations to contend the medium in slotted OFDMA mechanism. In some embodiments, the SOFDMA channel access mechanism can manage the contention time period into a couple of channel access time slots in which a station could perform channel access over an orthogonal frequency-division multiple access (OFDMA) sub-channel.

In another aspect, a method of expanding channel access slots is provided via information field in trigger frame, so that the SOFDMA capable AP could be able to configure and change the channel access duration dynamically based on the traffic load of BSS.

In another aspect, a method for quickly adapting to congestion is provided via including the OFDMA based contention window parameters in the trigger frame for a non-periodic channel access so that the SOFMDA capable stations can update their backoff counters for the next channel access period accordingly. A trigger frame may be transmitted as soon as needed, without having to wait for a next scheduled transmission of other frames such as a beacon frame.

In another aspect, a method is provided for SOFDMA capable stations to start transmitting a trigger response frame earlier when no transmission is detected in the previous channel access slot. In this way, it can further help improving the medium utilization and spectrum efficiency.

In another aspect, a legacy preamble is included in the trigger response frame to allow other stations to sense the medium busy via clear channel assessment (CCA) detection mechanism and to allow the SOFDMA capable AP to detect the trigger response transmission frame. Due to identical values used in the legacy preamble field of trigger response frame, the SOFDMA mechanism allows legacy preambles transmitted by multiple stations to be detected by others stations. In addition, the legacy preamble of trigger response frame could be used to reduce the probability of false detection of trigger response frame in TXOP.

In another aspect, a method of using OFDMA sub-channel distinguishable multiple trigger response frames from different stations is provided. With the orthogonal characteristics of OFDMA sub-channels, the AP could be able to distinguish the trigger response frames sent from different stations.

In another aspect, a method is provided for deferring a trigger response acknowledgement frame after the last channel access slot, which would reduce the switching time between uplink (UL) transmission and downlink (DL) transmission.

In yet another aspect, a method of arbitrating and scheduling contending stations is provided in the trigger response acknowledgement frame. This would allow multiple successful responding stations to be able to transmit or receive physical layer convergence procedure (PLCP) protocol data units (PPDUs) in scheduled manner following the channel access so as to improve the transmission efficiency.

In yet another aspect, a method of differentiated negative acknowledgement (NACK) to the trigger response frame is provided to assist the SOFDMA capable stations to determine the re-transmission of channel access. With the differentiated NACK, the station would be able to determine the collision condition in the current channel access and take a proper action for the re-transmission.

In yet another aspect, a method is provided how to protect the channel access period TXOP and HE transmission period to reduce the interference from other neighbor stations.

In yet another aspect, a method of enabling legacy EDCA channel access with SOFDMA channel access together is provided for the SOFDMA capable AP to have the full control of channel access in the congested condition.

Details of the above aspects and their implementations are set forth in the accompanying drawings, the description and the claims.

DETAILED DESCRIPTION

This document describes techniques, mechanisms, devices, and systems for multiple stations to access the medium using slotted OFDMA to improve transmission efficiency in contention based wireless communications.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
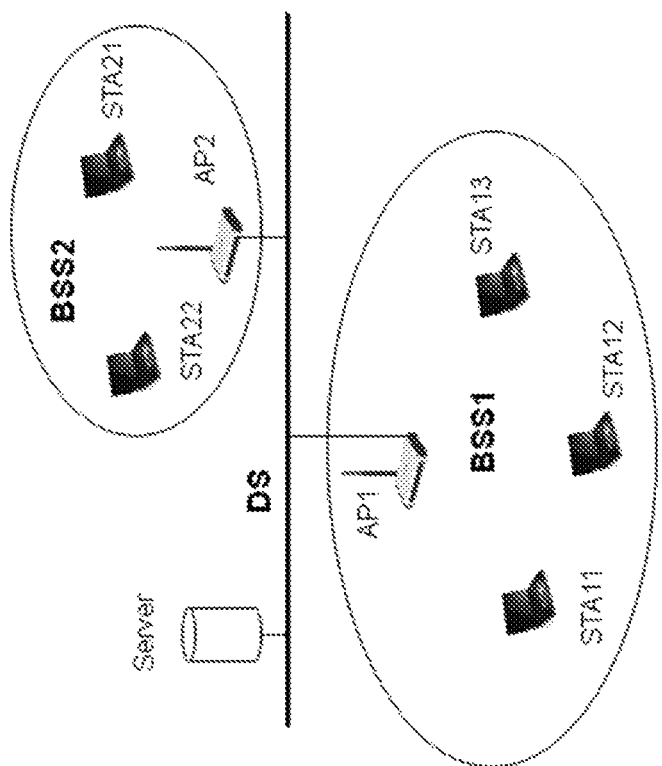
FIG. 1 shows an example of infrastructure BSS in a wireless communication system.

FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server or switch through a distribution system (DS) to form an Extended Service Set (ESS).

Figure 2:
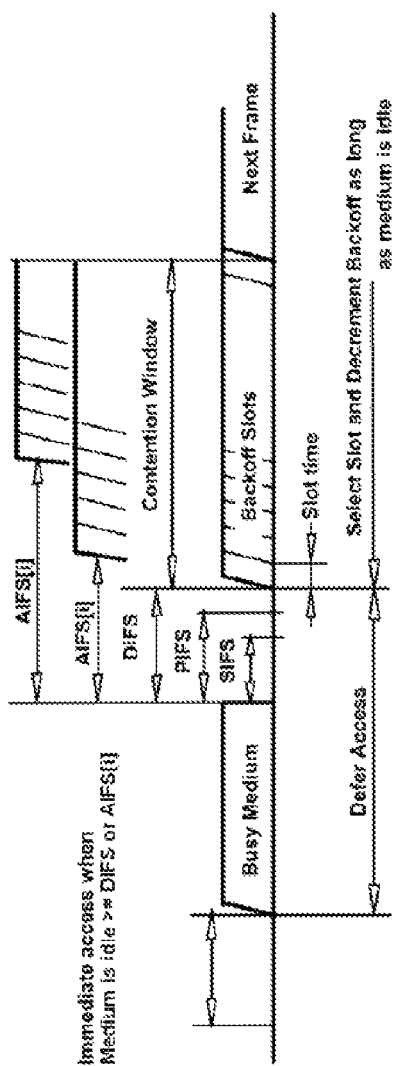
FIG. 2 shows an example of CSMA/CA mechanism in DCF of IEEE 802.11.

FIG. 2 illustrates an example of a CSMA/CA mechanism used in the current 802.11 networks. A station senses the medium. If the medium is sensed busy, the station defers access to the busy medium until the medium is determined as being in an idle state plus a period of time equal to xIFS when the last frame detected on the medium was received correctly. If the station is going to send a control frame such as acknowledgement (ACK), then it has to wait for short interframe space (SIFS) time before transmission. If the station is going to transmit a management frame, it has to wait for point coordination function (PCF) interframe space (PIFS). If the station is going to transmit a data frame, it has to wait for distributed (coordination function) interframe space (DIFS) or arbitration interframe space (AIFS) or enhanced interframe space (EIFS) before entering contention window.

The existing CSMA/CA mechanism used in IEEE 802.11 has significant overhead in each transmission and issue of medium utilization efficiency especially when a large number of stations share the same medium and are going to transmit simultaneously.

The present document discloses a channel access mechanism called Slotted Orthogonal Frequency Division Multiple Access (SOFDMA). In some embodiments, the disclosed technique can be used to improve the medium utilization efficiency. In some embodiments, the disclosed technique can be used to improve user experience, e.g., by reducing transmission latency.

In one advantageous aspect, the SOFDMA channel access mechanism combines certain advantages of central control function and distributed control function mechanisms. For example, in some embodiments, the SOFDMA mechanism can be implemented as a pre-contention and arbitration procedure that can be performed before actually occupying the medium for UL transmission. The SOFDMA capable AP can perform enhanced distributed channel access (EDCA) based contention to acquire the medium and transmit a trigger frame to commence the SOFDMA channel access procedure to allow multiple stations to simultaneously access the network using channel access.

In some embodiments, instead of contending for the medium in time domain used by EDCA, SOFDMA channel access mechanism manages the stations' contention in both the time and frequency domains, so as to reduce the station's waiting time in idle states while reducing the probability of collisions within a certain level.

In some embodiments, instead of judging the medium occupancy by contending stations, the SOFDMA channel access mechanism allows AP to arbitrate the contentions and notify successfully responding stations for transmissions in the following transmission opportunity, called High Efficiency Transmission Opportunity (HE-TXOP). The arbitration procedure lets the AP control and schedule UL transmissions from multiple stations so as to reduce the probability of collisions in HE-TXOP. In HE-TXOP, the single transmission from one winning station or sequential/parallel transmissions from multiple winning stations in either uplink multi-user (UL MU) OFDMA or uplink multi-user multiple-input and multiple-output (UL MU MIMO) are scheduled in a trigger response acknowledgement frame (or cascading trigger frame) to reduce the switching (gap) time between downlink and uplink transmissions.

Compared to the legacy CSMA/CA mechanism, the SOFDMA mechanism could improve the medium usage efficiency significantly especially in the high density deployment scenario.

In some embodiments, to support fairness of medium sharing with legacy CSMA/CA based stations, the SOFDMA channel access mechanism categorizes the medium occupancy in different time slots: legacy TXOP time slots for CSMA/CA stations to access the medium, the channel access TXOP time slots for SOFDMA capable stations to access the medium, and HE-TXOP time slots for scheduled SOFDMA capable stations to access the medium. The SOFDMA capable AP transmits the indication of the type of an upcoming transmission opportunity slot in a control frame, management frame, beacon or other type of frames such as a trigger frame to control SOFDMA capable stations to perform channel access to the medium only in CA-TXOP period. The SOFDMA capable AP can transmit such a frame (e.g., a trigger frame) as a standalone frame, e.g., as a PHY transmission by itself, periodically and/or non-periodically attaching with other frames. The SOFDMA capable AP can use broadcast beacon frame to carry the information of target trigger transmission time (TTTT) to inform SOFDMA capable stations the scheduled SOFDMA channel access period.

The SOFDMA capable AP can also include the multi-user channel access only (MUCAO) indication in the beacon frame. This MUCAO indication is used for the OFDMA capable AP to control the contention in the BSS based on the overloading condition. If an overload is detected, the AP sets MUCAO=1 to disallow the stations to perform EDCA based channel access so as to reduce collision. Once the station receives the MUCAO indication set to 1, it may contend the medium only through CA-TXOP allocated by the trigger frame. Otherwise, when the station receives the MUCAO indication set to 0, it is allowed to contend the medium in either EDCA or SOFDMA channel access depending on which mechanism can acquire the medium first.

The UL MU transmissions could be categorized for scheduled UL MU transmissions and UL MU channel access. If the AP knows HE stations' buffer status, it can schedule multiple HE stations at same time to perform UL MU OFDMA or MMO transmissions. If the AP does not know the HE stations' buffer status, it may acquire CA-TXOP for multiple HE stations to perform the SOFDMA based channel access simultaneously. In the CA-TXOP, the HE stations may use SOFDMA to report their buffer status, or send a UL transmission request indication which could be used by the AP to schedule UL transmissions later efficiently.

After completing CA-TXOP, the AP may schedule HE-TXOP time for scheduled UL transmissions so that HE stations could efficiently utilize the air interface.

Figure 3A:
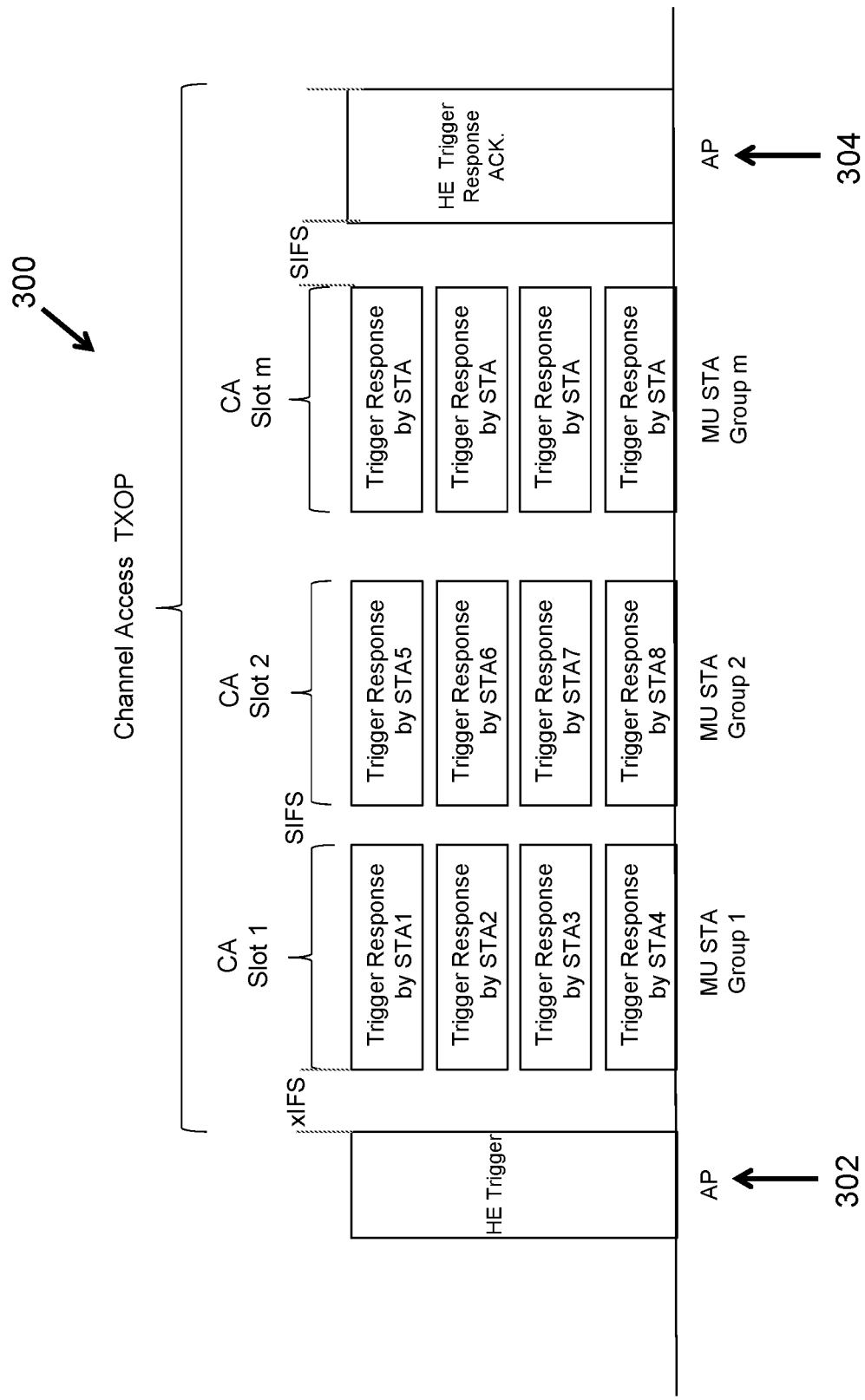
FIGS. 3A, 3B, and 3C show examples of SOFDMA mechanisms.

FIG. 3A shows an example of SOFDMA channel access mechanism 300 commencing from a trigger frame 302 transmitted by the AP.

The SOFDMA channel access mechanism divides the channel access transmission opportunity (CA-TXOP) into a couple CA slots in time domain after the trigger frame 302. The number of CA slots could be from 1 to m. Each CA slot may have the same or different transmission time duration indicated by the trigger frame to allow a group of STAs to perform access to the medium, such as in the channel access slot 1, 2 or 3 (CA Slot 1, 2, or "m" shown in FIG. 3A). The time gap between the trigger frame and the first CA slot is xIFS time (i.e., SIFS or PIFS), and between two consecutive CA slots is SIFS.

The CA-TXOP process commences at the trigger frame 302 sent by the SOFDMA capable AP and ends at the trigger response acknowledgement frame (e.g., TRack or TRnack) sent by the AP. The TRack or TRnack could be a frame 304 of multi-user Block Ack (MU-BA).

When sensing the medium idle and its NAV=0, the SOFDMA capable AP transmits a trigger frame with CA-TXOP indication to notify the following time interval is used for SOFDMA based UL MU channel access transmissions. The CA-TXOP indication would be a special AID defined for channel access, or other parameter. The SOFDMA capable AP should set its Duration field of the trigger frame to the time used by SOFDMA process:

xIFS+m×(Ttr+SIFS)+SIFS+Ttrack where
xIFS is SIFS or PIFS time for all the stations in CA-TXOP
"m" is the maximum number of CA slots in CA-TXOP for the SOFDMA based UL MU channel access. AP can dynamically change this setting based on the traffic load and/or number of associated stations in BSS
Ttr is the transmission time of trigger response frame (here it assumes each trigger response frame has same transmission duration, otherwise, Ttr on different CA slot should be calculated individually) and
Ttrack is the transmission time of Trigger Response Ack (or Nack) frame 304.

Figure 3B:
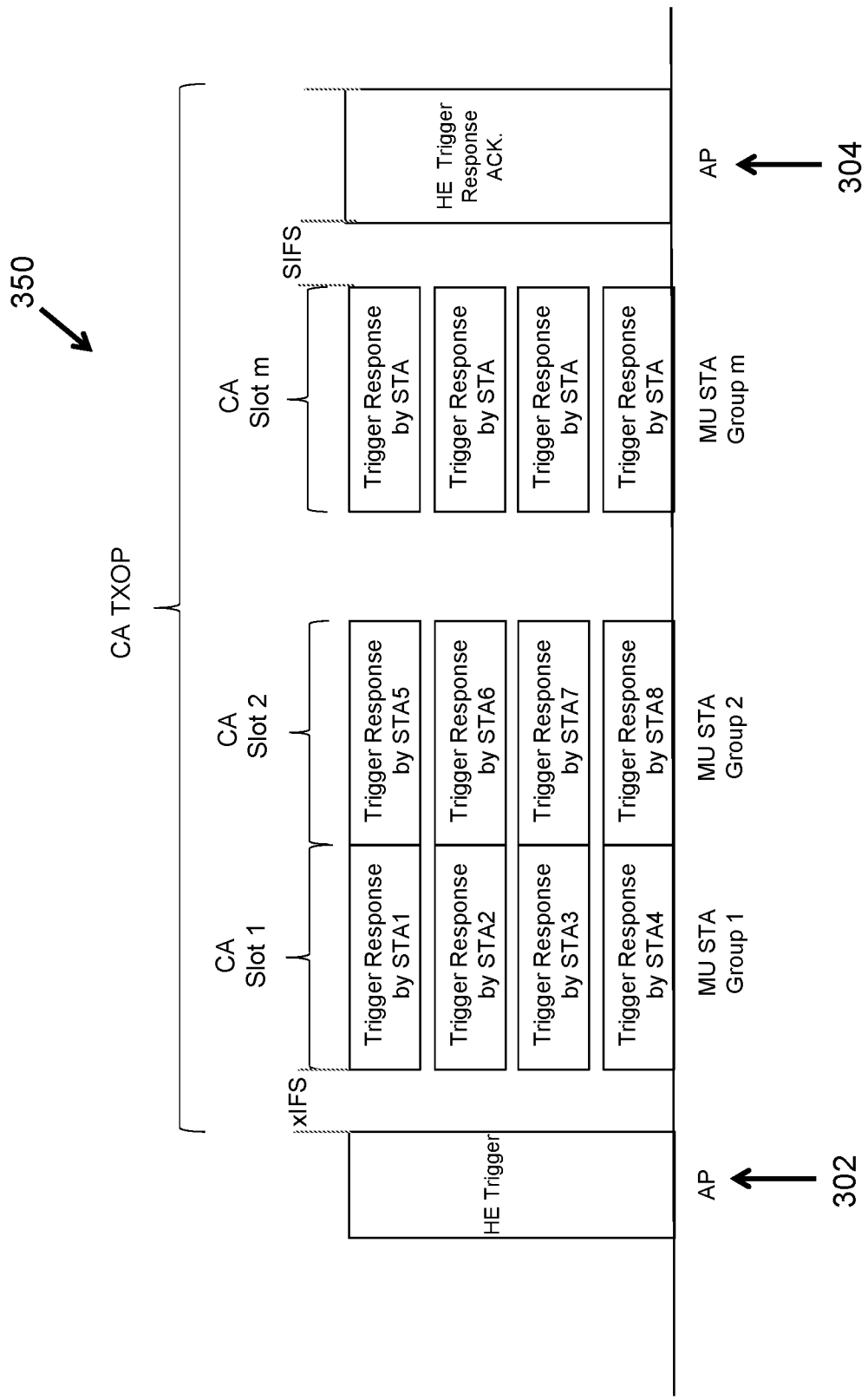

FIG. 3B illustrates another example of SOFDMA mechanism 350. In this option, each CA slot may have the same or different transmission time duration indicated by the trigger frame to allow a group of STAs to perform access to the medium, but there is no time gap between two consecutive slots.

Figure 3C:
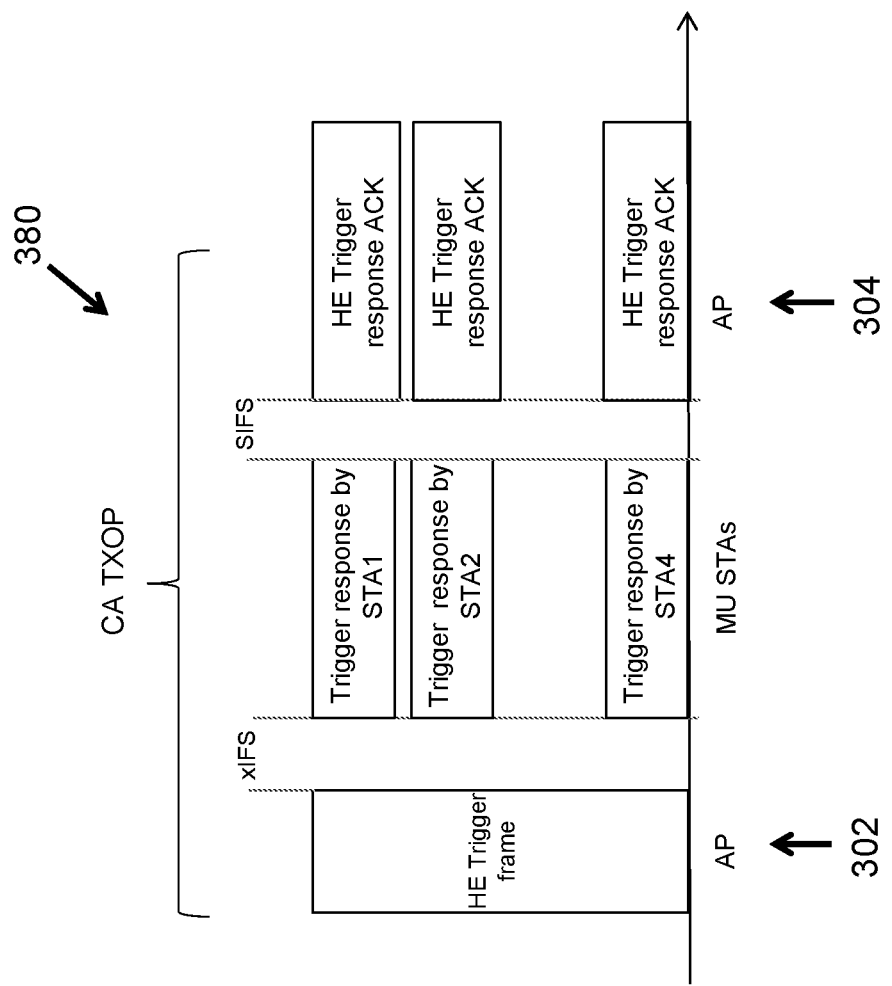

FIG. 3C illustrates a simple case of SOFDMA mechanism 380. In this case, there is only one channel access slot (m=1) allocated by the AP. In the channel access slot, one or more SOFDMA capable stations are allowed to contend the medium in OFDMA channel. When the AP specifies the CA slot allocated for the special STA AID (such as AID=0), then all the SOFDMA capable stations could be access the slot via OFDMA. If the AP specifies the CA slot for a group of station via listing the STA AIDs in the trigger frame, only the listed SOFDMA capable STAs can access the CA slot via OFDMA.

Legacy stations and SOFDMA capable stations in OBSS could use the BSS identifier in the trigger frame to differentiate CA-TXOP of OBSS and may also use the Duration information of the trigger frame to update their NAV values. SOFDMA capable stations in the BSS may not update their NAV values to CA-TXOP duration since they may need to contend the medium via SOFDMA channel access during CA-TXOP. A station that used information from the trigger frame as the most recent basis to update its NAV is permitted to reset its NAV if no Trigger Response Ack (TRack) frame is detected.

In order to prevent the hidden node situation, the SOFDMA capable AP may use a sectorization scheme to transmit a trigger frame so that only SOFDMA capable stations within the sector of the BSS will hear the trigger frame and not set the NAV. In this case, SOFDMA capable AP may transmit an omni-direction frame first to allow all stations in nearby BSSes to set their NAV, and then send a sectorized trigger frame to enable SOFDMA capable stations within the sector to perform SOFDMA based channel access.

The SOFDMA capable AP may maintain a CA slot counter to calculate the CA slot elapses in the CA-TXOP if the number of CA slots m is greater than 1. Once the AP detects the medium idle for aSlotTime (for the option in FIG. 3A) or the time elapsed over the duration of the CA slot (for the option in FIG. 3B), it decreases the CA slot counter by one and continue sensing the medium until the CA slot counter reaches the end in the CA-TXOP. Then the SOFDMA capable AP will transmit the trigger response acknowledgement frame to release the CA-TXOP.

For the simplest case (m=1), if the AP detects the medium idle for aSlotTime (for the option in FIG. 3A) or the time elapsed over the duration of the RCA slot (for the option in FIG. 3B), the SOFDMA capable AP may transmit the trigger response acknowledgement frame or other frame to release CA-TXOP explicitly.

If no Trigger Response (TR) frame is received during CA-TXOP period, this CA-TXOP will be released automatically.

The trigger frame can be implemented in a new frame format, or in a new information element (IE) of MAC to carry the SOFDMA related information. If SOFDMA information is carried in IE, it could be transmitted in a beacon frame, control frame or management frame.

The trigger frame (or attached to control frame, management frame, beacon frame with trigger information) could be used by SOFDMA capable stations to perform timing synchronization to the timing reference of AP.

In order to provide fairness of access to the medium for legacy CSMA/CA stations and SOFDMA stations, the SOFDMA capable AP can adjust the number of CA slots in a given period of time according to the ratio of the number of legacy CSMA/CA stations to the number of SOFDMA stations, or other ratio of access time between legacy and SOFDMA stations based on the operation policy such as access network loading. In this way, it would give fair opportunity and time of occupancy to both legacy stations and SOFDMA stations.

Figure 4:
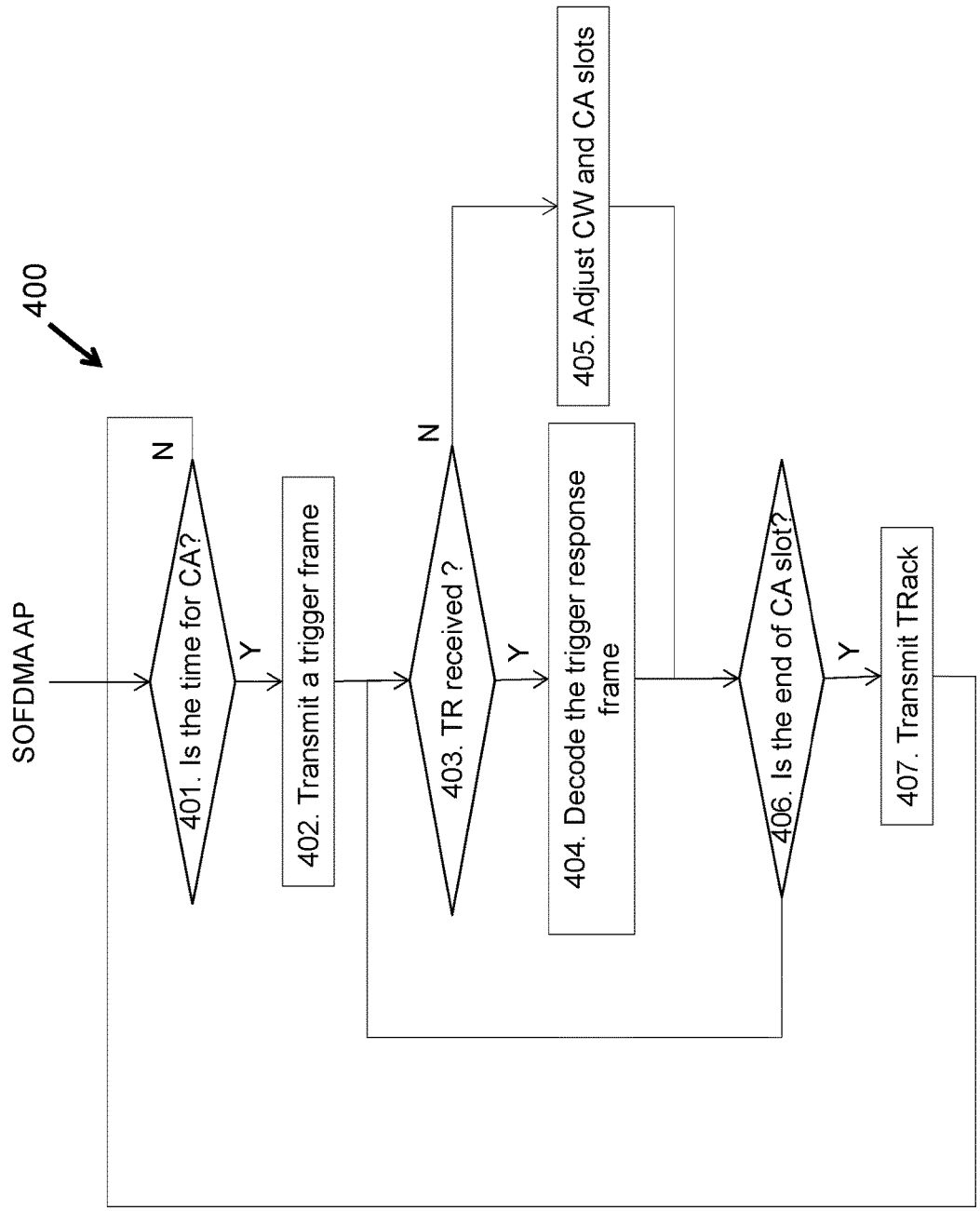
FIG. 4 shows an example of AP SOFDMA channel access procedure.

FIG. 4 illustrates an example of AP's SOFDMA channel access procedure 400.

401. The SOFDMA AP determines whether or not the next transmission time is for SOFDMA channel access based on the traffic load of legacy stations and HE stations, or ratio of legacy and HE stations or other fairness policy. The AP broadcasts the target trigger transmission time in the beacon frame to notify the HE stations for the coming MU CA-TXOP so that stations would be prepared for listening to the trigger frame.

402. If the upcoming transmission time is for SOFDMA channel access, the AP resets the CA counter to 0 and transmits the trigger frame to indicate commencing the SOFDMA channel access, and include MU RA parameters in the trigger frame, such as:

a) the duration of CA-TXOP: the AP can estimate the length of MAC service data unit (MPDU) and required CA-TXOP duration. All the stations that contend in the triggered CA-TXOP should be finished with their transmissions at time indicated by the CA slot of CA-TXOP Duration. If the station cannot complete transmission within one CA-TXOP, it can request more CA with "More=1,", and apply frame fragmentation mechanism to combine the fragmented frames into one frame. If the station cannot fill up the entire CA slot of CA-TXOP, it can pad remaining bits with "0" until the end of CA slot;

b) the number of CA slots in the CA-TXOP: 1 to m; if m=1, it means there is only one CA slot for the channel access.

c) the duration of each CA slot, or single duration value for all CA slots if they are same;

d) the OFDMA contention window size (CWmin, CWmax): this is optional information as it is carried in the broadcast beacon frame periodically. In order to fast adapt to the congestion condition, the AP can include this information in the trigger frame. When a HE station receives this information in trigger frame, it will replace the stored parameters received from the beacon frame and use them for following CA-TXOP;

e) the number of resource blocks used for the channel access (optional), and their locations;

f) the list of stations to allow perform channel access (optional): the AP can include this information to restrict a certain stations to perform the channel access on the triggered CA-TXOP so as to reduce the collision probability. For example, the AP can include the list of STA AIDs in the trigger frame to allow those specified STAs only to perform the access to the CA slot(s) in the CA-TXOP. The default value is non-constricted, i.e., all the HE stations are allowed to perform channel access in the triggered CA-TXOP; and g) trigger response acknowledgement policy. The default trigger response acknowledgement policy is set to 0, i.e., deferred trigger response acknowledgement to the end of CA slots. Otherwise, the trigger response acknowledgement policy (=1) is set to immediately acknowledge the trigger response frame by the AP. The AP may also optionally include the allowed trigger response (i.e., channel access) type information, for example the buffer status, association request, etc., in the trigger frame. The default type is to allow any response for channel access. If the trigger response type is specified in the trigger frame, the HE station can transmit the frame of required frame type in the trigger response frame in CA-TXOP and other packet or padding if there still have leftover space.

403. After transmitting a trigger frame, the AP switches to receiving mode and monitors the operating channel for receiving trigger response frames.

404. If the AP receives a trigger response frame in a CA slot, it will decode the trigger response frame and process the information associated to SOFDMA transmitting station(s).

405. If the AP does not receive a trigger response frame in aSlotTime of the CA slot, it may adjust the CWmin and CWmax size and CA slot number to improve efficiency of future SOFDMA channel access.

406. The AP continues monitoring the medium. If AP detects the medium in idle state for aSlotTime (for the option in FIG. 3A, or the time elapsed for the CA slot duration for the option in FIG. 3B), it decreases the CA slot counter by 1. If the trigger response acknowledgement policy is set to the deferred policy and the CA slot counter does not reach the end of CA slots, it goes to step 403 to continue monitoring the channel and receiving trigger response frame. Otherwise, the AP responds to the trigger response frame immediately with a TRack if the AP decodes the trigger response frame successfully. If the AP does not decode the trigger response frame transmitted over the OFDMA subchannel, the AP can then transmit TRnack:

A) If the RSSI of trigger response frame is detected greater than a specific threshold (which means the collision might occurs), the AP will sends the TRnack with Backoff Increase indication (BOI>0) to indicate the CA transmission over the OFDMA sub-channel failure and request re-transmission with more backoff over the OFDMA CA subchannel in next CA-TXOP. When the HE station receives the TRnack with BOI>0 over the OFDMA sub-channel that the channel access was sent, it may double its CW size, reset its BO counter to a new random value in [0, CW] and prepare re-transmission in the next CA-TXOP.

B) If the RSSI of trigger response frame is detected below a specific threshold (which means there is no enough SNR of received frame over OFDMA sub-channel), the AP should send a TRnack with BOI=0. When the HE STA transmitting the channel access over that OFDMA sub-channel receives this TRnack with BOI=0, it prepares re-transmission using its current backoff counter value.

The AP may include BOI information in the trigger frame to instruct the HE STA to set the contention window for the following channel access and channel access re-transmission.

407. If the CA slot counter reaches the end of CA slots (i.e., the maximum number of CA slots in CA-TXOP), the AP transmits the trigger response acknowledgement (TRack) frame to indicate the stations of which trigger response frames are successively received. Once the TRack is sent, the SOFDMA channel access procedure is ended and CA-TXOP is released. If no trigger response frame is received in any CA slot, the AP may either transmit the trigger response acknowledgement frame without any successfully responding station or other frame to explicitly release the current CA-TXOP, or not transmit a frame to let the current CA-TXOP released automatically.

In the TRack (or TRnack) frame, the AP may also allocate the resource blocks to schedule UL transmissions for successfully responding stations (or for scheduling re-transmission), and switch from the channel access to the scheduled access in the following HE-TXOP, e.g., aggregating the acknowledgement frame with trigger frame. Therefore HE stations could efficiently use the air interface to transmit the UL data. In this way, the stations could first report its UL buffer status or send transmission request indication using the high efficient SOFDMA channel access procedure and then wait for the scheduled access to transmit a large size payload over either OFDMA or MIMO channels.

On the station side, when receiving a trigger frame with CA-TXOP indication, the SOFDMA capable stations with NAV=0 in the BSS could contend the medium using SOFDMA channel access mechanism.

A SOFDMA capable station may transmit the trigger response frame in a resource unit (RU) of CA slots in CA-TXOP. After receiving the trigger frame, the first identified group of SOFDMA capable stations may contend the medium in xIFS time via transmitting trigger response frames.

Figure 5A:
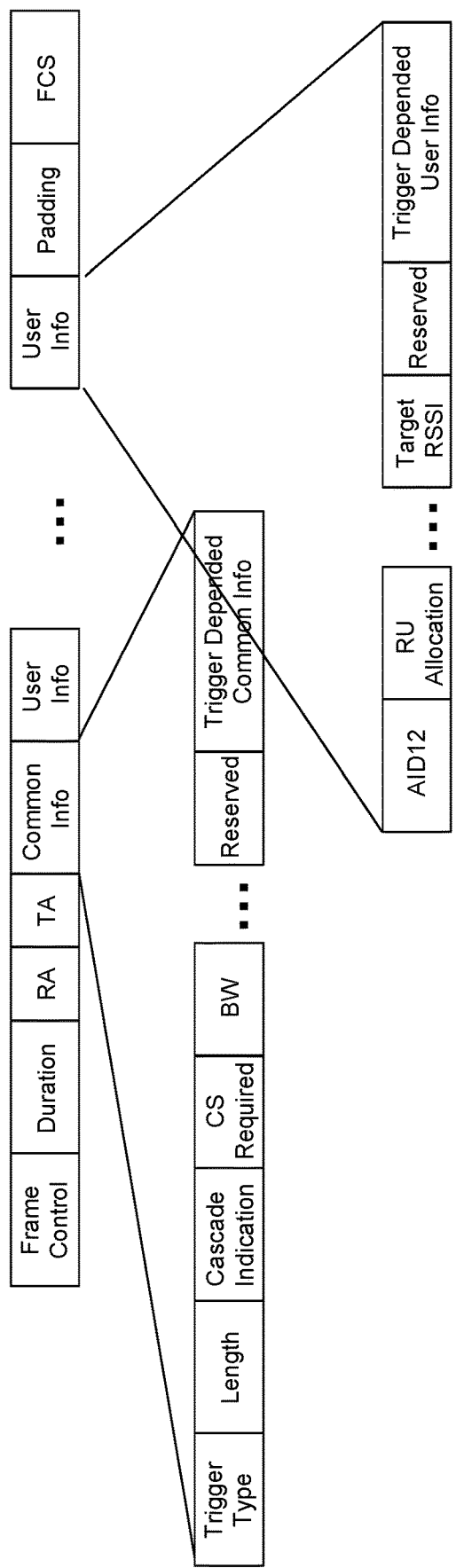
FIGS. 5A-5B show examples of trigger response frame structure.

FIG. 5A shows an example of trigger frame for the SOFDMA channel access. The trigger frame is a media access control (MAC) frame which can be carried in any physical (PHY) frame. The trigger frame consists of the fields as following:

Legacy Fields: Frame control, Duration, receiver address (RA), and transmitter address (TA)

Common Information field: this is the trigger related field, which carries the information used for all the triggered stations.

User Information field (s): this field is to specify the information associated with the particular trigger responding station. It could have one or more fields depending on the AP.

In the Common field of trigger frame, it specifies the type of trigger frame, cascading information, carrier sensing required, bandwidth information and trigger dependent common information.

In the User Information field, it contains AID field which specifies the trigger responding station; RU allocation for the station, Target RSSI which is used to determine the transmit power of the trigger responding station.

When the AP starts the SOFDMA procedure via sending a trigger frame, it can specify the type of trigger frame and determine how to notify the group of stations to respond to the trigger frame. If the AP specifies AID as the pre-specific value like 0, it indicates the SOFDMA is used as the channel access for all the SOFDMA capable stations. All the SOFDMA capable stations can contend the CA slot to respond to the trigger frame. If the AP specifies the list of stations in the User Info fields, then only those specified stations are allowed to contend the CA slot(s) and send a frame in one RU of CA slots.

Figure 5B:
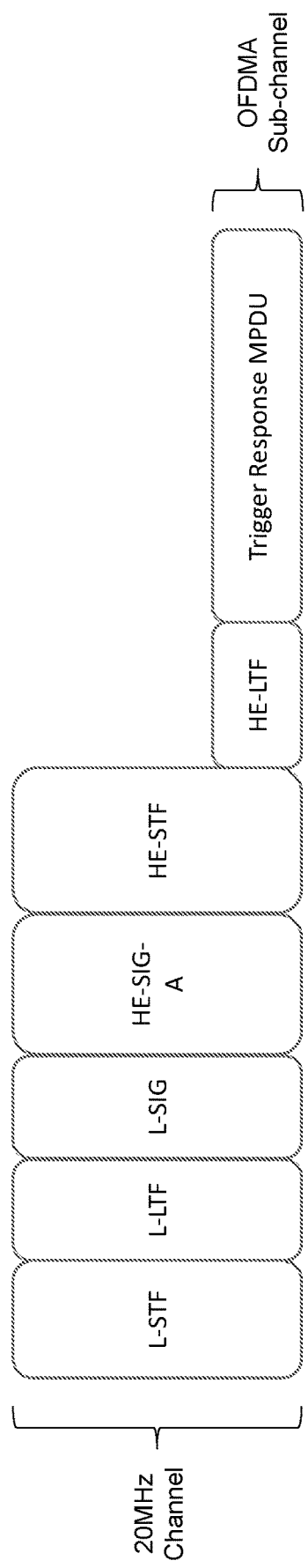

FIG. 5B shows an example of UL MU trigger response (e.g., channel access) frame format. The trigger response frame may consist of:

a) Legacy preamble: legacy short training field (L-STF), legacy long training field (L-LTF) and legacy signal field (L-SIG)

b) HE preamble: HE-SIG and HE-short training field (HE-STF)

c) HE-long training field (HE-LTF)

d) Trigger Response MPDU.

The legacy preamble field of trigger response frame would be used by the AP and other STAs for the timing and frequency synchronization and CCA detection so as to protect the CA-TXOP contended from legacy EDCA stations during the SOFDMA channel access, when legacy stations and HE stations were deployed in the same area and on the same frequency channel. In addition, the legacy preamble field of trigger response frame could be used to identify the current contention window for UL MU SOFDMA transmissions.

The example illustrated in FIG. 5B shows fields like L-STF, L-LTF and L-SIG, which may be used for backward compatibility to the legacy STAs. When the SOFDMA stations share the same frequency channel with legacy stations, the first two sub-fields are the same as the legacy preamble so that legacy stations could detect medium occupancy with legacy CCA detection mechanism. If stations miss detecting the first two sub-fields on legacy preamble, they could apply the energy detection mechanism in the middle packet transmission to detect the medium usage status. The L-SIG field in the trigger response frame is also used for compatibility to legacy STAs, but it may be set to identical values by all SOFDMA responding stations which contend the same CA slot.

With reference to FIG. 5B which shows an example setting of various fields of the L-SIG.

a) Rate bits of L-SIG may be set to "BPSK r=½" for SOFDMA trigger response frame.

b) Reserved bit of L-SIG field may be set to "1" to indicate the SOFDMA trigger response frame.

c) Tail bits of L-SIG field may be set to "0." Parity bit P may be set to achieve parity consistency for the L-SIG field.

d) Length bits of L-SIG may be set to "duration of remaining CA-TXOP." L-SIG Length field in trigger response frame is to protect transmission of SOFDMA channel access procedure. It should be set to the duration counted from the beginning of trigger response frame to the end of Trigger Response Ack frame.

In order to make the transmission more reliable for SOFDMA capable stations, L-SIG may be duplicated.

Since all SOFDMA capable STA use the identical settings in L-SIG of trigger response frame during the contention, therefore legacy preamble fields transmitted from multiple stations would be same. This transmission characteristic can be advantageously used by the AP or the other station to simply treat the received signal as a multi-path from a single source. In other words, when multiple stations transmit the legacy preamble of trigger response frames at same time, no additional reception challenged is faced by receiving modules of the AP or another receiver, which typically are designed to mitigate effects of multipath and decode received signal.

Assuming STAs have been synchronized to AP based on the trigger frame, if the timing and frequency alignment of STAs to AP is within a certain threshold, the AP and other nearby STAs (including legacy ones) could be able to synchronize with the legacy preamble field of trigger response frame and decode the L-SIG.

Legacy preamble fields of the trigger response frame are transmitted over the entire bandwidth of 20 MHz channel to prevent the channel from being occupied by legacy stations, or other stations in OBSS. When a station receives a legacy preamble of the trigger response frame, it may set NAV if the station is in OBSS.

HE preamble fields shown in FIG. 5B may be used to carry the HE frame format information and training sequences. The HE-SIG-A field and HE-STF, if exist, are transmitted over the entire 20 MHz channel, while HE-LTF training sequence fields, if exists, is transmitted over one OFDMA sub-channel.

Trigger Response MPDU carries the information of individual STA such as the buffered data status for UL transmission, channel or OFDMA sub-channel measurement information, UL transmission request indication, etc. The trigger response MPDU should be transmitted over an OFDMA sub-channel which consists of a set of OFDM sub-carriers in 20 MHz channel. For the case of simple trigger response, the AP can specify not to include the MPDU field in the trigger frame (i.e., NDP based trigger response). Therefore, when the OFDMA capable station receives such trigger frame, it does not include the MPDU field in the trigger response frame. Instead, it only transmits the legacy preamble field and HE preamble field in the trigger response frame. When the AP receives the trigger response frame, it has to rely the HE-LTF field to distinguish the responding stations.

In order to evenly distribute STAs across the CA-TXOP (or multiple CA-TXOPs), a SOFDMA capable station may use a backoff (BF) counter to control the UL channel access in a CA slot of CA-TXOP if AP does not specify the particular responding stations in the trigger frame. Initially, the SOFDMA capable STA sets its backoff counter randomly in the range of contention window (CW) provided by the AP in either management frame like beacon, or in the trigger frame. The backoff counter uses time ticks of trigger frame, CA slot counter and idle time measurement in the unit of aSlotTime. After receiving the trigger frame, the SOFDMA capable station checks the permission for the channel access and its backoff counter value, and transmits the trigger response frame in SIFS time if the backoff counter is equal to 0 and it is permitted in CA-TXOP. FIG. 3A and FIG. 3B show a group (MU STA Group 1) of STAs which backoff counters reach 0 at receiving the trigger frame. Those STAs (STA1, 2, 3 and 4) will start transmitting the trigger response frame immediately after xIFS time of the trigger frame. Other SOFDMA stations will decrease their backoff counters by 1 and continue sensing the medium for transmission opportunities in next CA slots. Once the CA slot finishes, the CA slot counter is decreased by one.

If the AP specifies the particular trigger response stations in the User Info field of trigger frame, the identified stations shall transmit the trigger response frame over the allocated RU of CA slots immediately after receiving the trigger frame, if it needs to respond. Otherwise, the identified station may not need to respond to the trigger frame, as if it has no UL transmission request.

As the legacy preamble of trigger response frames from MU STAs (STA1, 2, 3, and 4) carry the same information, the legacy preambles of trigger response frame from different STAs may be viewed as multi-path signals of single legacy preamble when they arrive at the AP at different time. As long as those "multi-path signals" do not spread out too much (i.e., within a CP of OFDM symbol), the receiving stations could be able to decode them.

As HE-LTF training sequence and/or HE MPDU are transmitted over OFDMA sub-channels, which are orthogonal to each other, the trigger response frames sent from different STAs do not interfere to each other even they are transmitted over the same 20 MHz channel at the same CA slot.

SOFDMA channel access mechanism requires all the UL MU transmissions from different stations to be ended at the same time, i.e., at the CA slot boundary. This is no problem for the legacy preamble and HE preamble. For HE MPDUs from different stations, it requires to have same length even they may carry different contents. If a trigger response frame is shorter than a CA slot duration, some padding may be added at the end of frame to make all the transmissions ended at the CA slot boundary exactly. If the STA cannot complete its transmission within the CA slot, it can request more channel access in next CA-TXOP with "More=1" in the frame header, and apply frame fragmentation mechanism to combine the fragmented frames into one MSDU frame.

After the first group of STAs (STA 1, 2, 3, an 4) complete their transmissions in CA Slot 1, other SOFDMA stations will detect the medium in the idle state for aSlotTime or time elapsed for a CA slot duration from the beginning of the CA slot. The SOFDMA stations will decrease their backoff counters by one. If their counters reach 0, the second group of stations (STA 5, 6, 7 and 8) would start their transmissions of trigger response (i.e., channel access) frames in the second slot (CA Slot 2), i.e., in SIFS after the first CA slot ends (for the option in FIG. 3A) or would start their transmissions of trigger response frames in the second slot (CA Slot 2) immediately (for the option in FIG. 3B).

Figure 6:
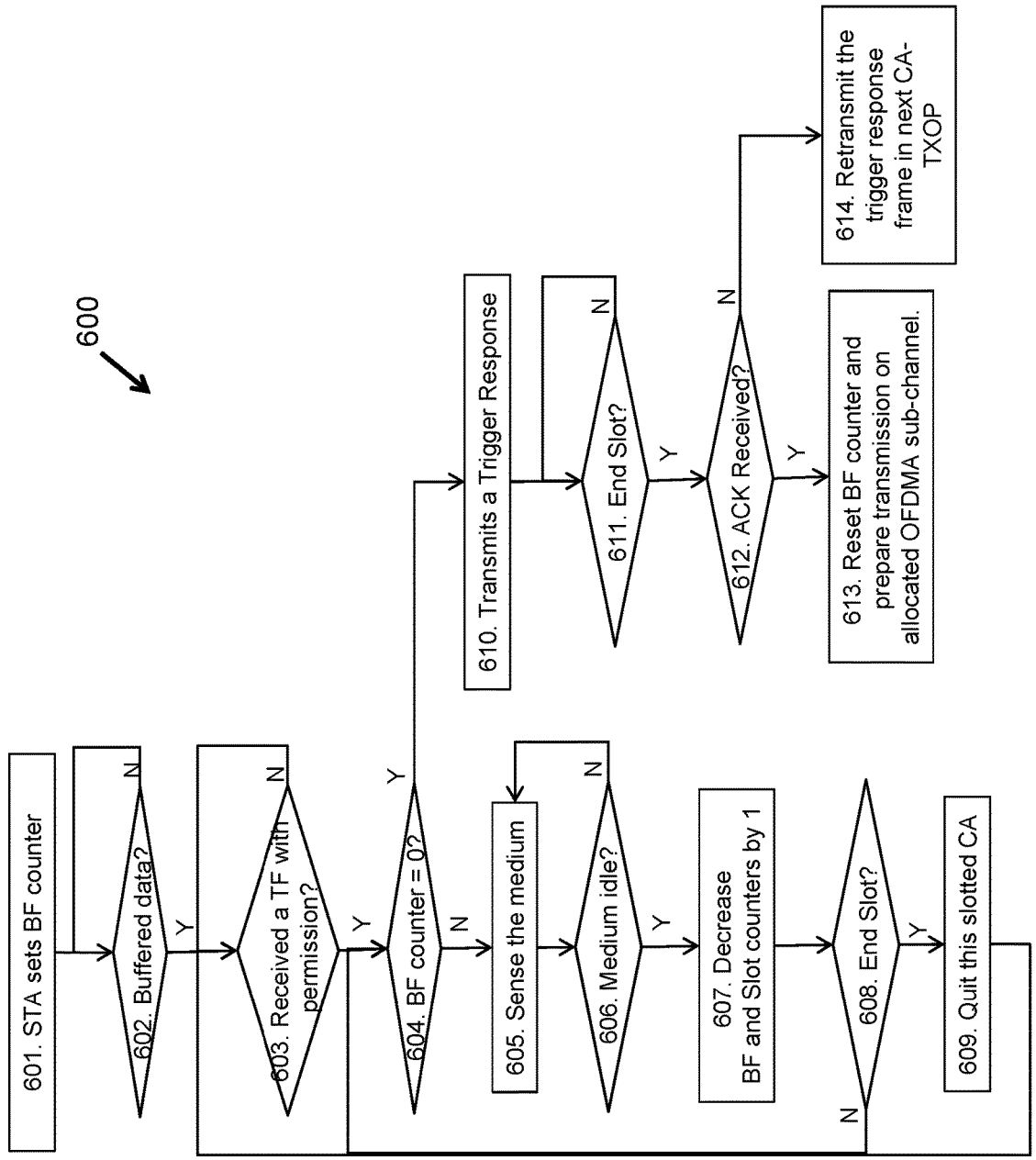
FIG. 6 shows an example of trigger response procedure.

FIG. 6 illustrates an example of trigger response frame transmission procedure 600.

601. A station sets its backoff counter value randomly between 0 and CW, where CW is the size of the contention window between CWmin and CWmax which are received from the SOFDMA AP in beacon frame or trigger frame.

602. If the station has some buffered data for UL transmissions or request UL transmission, it will enter the SOFDMA channel access procedure.

603. The station senses the channel and waits for a trigger frame from its BSS to commence CA-TXOP. After receiving a trigger frame, the station checks whether it is allowed to contend in the current CA-TXOP. If the station is not in the permitted station list, it will continue monitoring the channel for next CA-TXOP. Otherwise, the station will reset the CA slot counter to the value specified in the trigger frame.

604. The station checks its backoff counter value if the AID is set to 0 in the trigger frame. Otherwise if the responding STA(s) is specified in the trigger frame, it goes to the step 610 to transmit the trigger response frame immediately.

605. If the value of backoff counter is greater than 0, the station continues sensing the medium for transmission opportunity in next CA slots. Alternatively, if the station detects legacy preamble of trigger response frame from other stations, it may go to sleep for about CA slot duration time and wake up before the end of the CA slot to continue monitoring transmissions. Therefore it may save power of the station.

606. The station senses the medium until the medium becomes idle (for the option in FIG. 3A), or the current CA slot is ended (for the option in FIG. 3B).

607. If the station detects the medium in idle for aSlotTime (for the option in FIG. 3A) or the CA slot time expired (for the option in FIG. 3B), it will decrease its backoff counter and the slot counter by 1.

608. If the slot counter does not reach the end of CA slots in CA-TXOP, the station will go to the step 4 to check whether the backoff counter reaches 0 for transmitting trigger response frame.

609. If the slot counter indicates it is the end of CA slots in CA-TXOP, the station will keep the current value of backoff counter and quit the current CA-TXOP procedure and wait for opportunity in next CA-TXOP.

610. If the backoff counter reaches 0, it indicates the current CA slot is for the station to transmit the trigger response frame. The station transmits a trigger response frame in xFIS time after receiving the trigger frame if the CA slot is the first CA slot in CA-TXOP, or in SIFS time from the previous CA slot end boundary (for the option in FIG. 3A), or immediately following the previous CA slot (for the option in FIG. 3B).

611. After transmitting the trigger response frame, the station waits until the end of CA slots to receive the trigger response acknowledgement frame if the trigger response acknowledgement policy is set to the deferred trigger response acknowledgement in the trigger frame. Otherwise, the station may check the acknowledgement frame immediately after sending out the trigger response frame.

Alternatively, the station may go to sleep for every CA slot until the end of CA slots so as to save power if the trigger response acknowledgement policy is set to the deferred trigger response acknowledgement in the trigger frame.

612. The station checks whether the trigger response ack (TRack or TRnack) frame is received.

613. If the TRack frame is received successfully, which indicates the SOFDMA CA procedure succeeds, the station can reset the backoff counter to a new value between 0 and CW−1. If the AP provides the UL scheduling information in the TRack frame (or TRack combining with Trigger frame) for winning SOFDMA stations to transmit UL data, the successful responding SOFDMA station can transmit UL data over either allocated OFDMA sub-channels or full bandwidth via UL MIMO at the scheduled time.

614. Otherwise, if the SOFDMA station does not receive the acknowledgement to its trigger response frame or receives a TRnack, it needs to prepare for re-transmission.

A) If the HE station receives a TRnack (or TRnack combined with Trigger frame) with BOI>0 over the OFDMA CA sub-channel that the channel access was sent, it can double the CW size and re-select a random value between [0, CW−1] for the backoff counter, and wait for the next CA-TXOP to retransmit the trigger response frame.

B) If the HE STA transmitting the MU channel access over that OFDMA sub-channel receives a TRnack with BOI=0, it can prepare re-transmission using its current backoff counter value.

Assuming N OFDMA sub-channels could be used for transmitting individual trigger response frames without collision. When a SOFDMA capable station acquires a CA slot, it can select one of N OFDMA sub-channels. As the total number of OFDMA sub-channels is limited by OFDM resource blocks (or units), it is not practical for a station to get a permanent OFDMA sub-channel for channel access. In other words, N OFDMA sub-channels have to be shared by all the SOFDMA stations for UL channel access.

In order to evenly distribute the SOFDMA STAs over the limited OFDMA sub-channels, i.e., the number of resource blocks (RB), an associated station may select the OFDMA sub-channel for channel access via the operation of (its AID mod RB), as an example. For the un-associated station, it may randomly pick-up a number between [0, RB−1] of OFDMA sub-channel.

The SOFDMA capable AP could use the number of CA slots to control the initial access latency and use the (CWmin, CWmax) to prevent a large number of stations from accessing the medium at same CA-TXOP.

If the AP detects many empty CA slots in a CA-TXOP, the AP could reduce the CWmin.

If the AP detects collisions in many OFDMA sub-channels, it could increase the CWmin.

If there are many associated stations in BSS, the AP could increase the number of CA slots to allow more stations to perform channel access in a CA-TXOP and reduce the access delay.

In some cases, none of backoff counter of SOFDMA stations reaches 0 when receiving a trigger frame from the AP. Therefore, no station is able to transmit the trigger response frame in the first CA slot even they have some buffered data for UL transmission. In this saturation, the CA slot in CA-TXOP is empty and wasted.

Figure 7A:
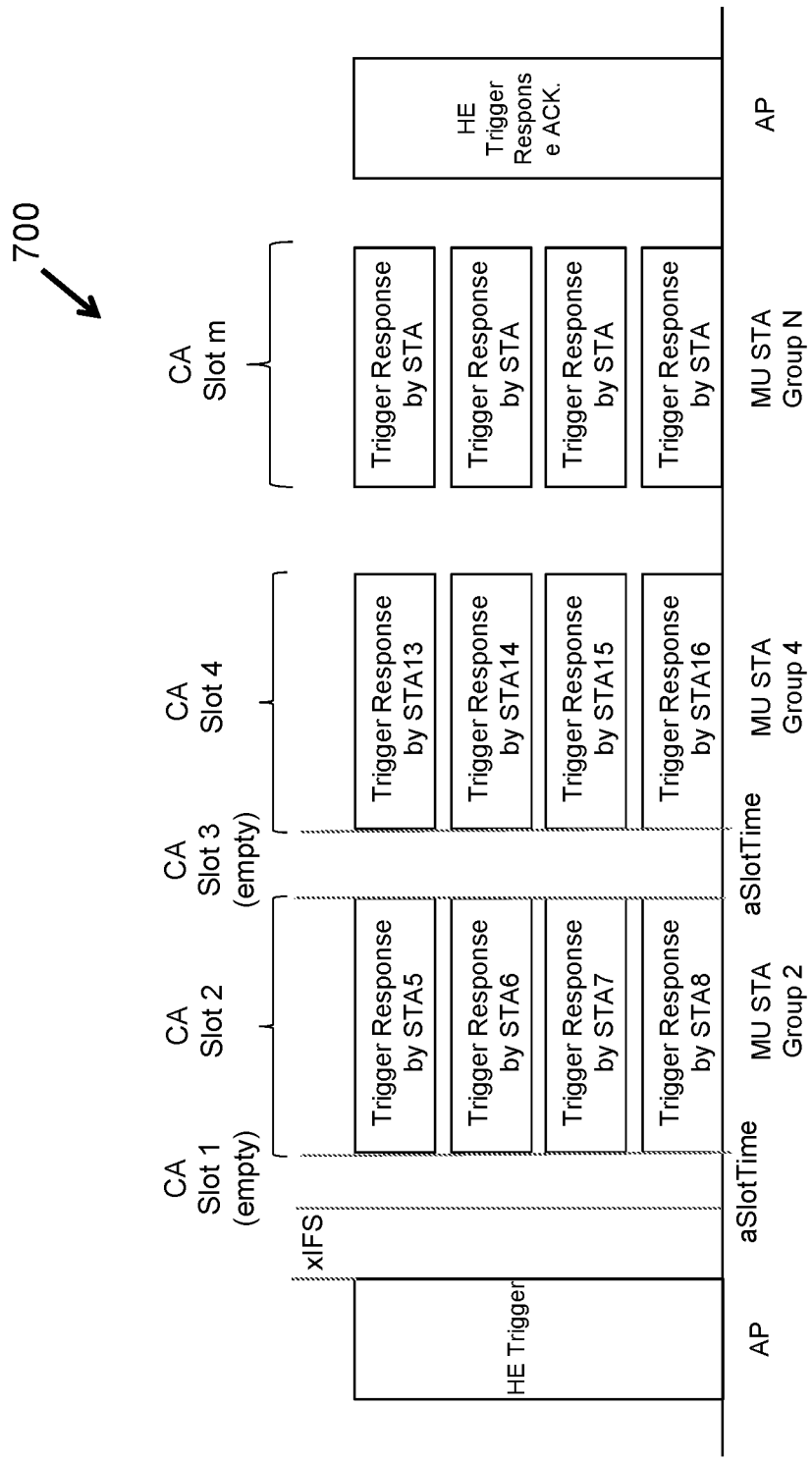
FIGS. 7A-7B show examples of SOFDMA based channel access with early response.

FIG. 7A shows the example of SOFDMA based channel access mechanism 700 with early response to reduce such waste of CA slot.

If permitted for channel access in the CA-TXOP, a SOFDMA station with the backoff counter=0 will transmit a trigger response frame in xIFS time after receiving the trigger frame. Other SOFDMA stations with backoff counter>0 should decrease the backoff counter and CA slot counter by one after receiving the trigger frame and continue sensing the medium (i.e., not belonging to CA slot 1). If no transmission is detected for aSlotTime after the beginning of CA Slot 1 (i.e., CA Slot 1 is empty) and the backoff counter reaches 0, the station can transmit a trigger response frame in aSlotTime from the starting time of CA Slot 1 (i.e., xIFS+aSlotTime from the trigger frame). In this way, the trigger response frame in the second CA slot would be moved forward once the station knows the previous CA slot is empty, and it is not necessary to wait until the empty CA slot ends. Therefore it could reduce the air time waste. Similarly, other stations STA13, 14, 15, 16 in the group 4 will continue sensing the medium. If no transmission is detected for aSlotTime in the CA Slot 3, the backoff counter reaches 0 and the counter of CA slot does not reach the end in CA-TXOP, those stations can transmit the trigger response frame at the CA slot advanced.

The early response will reduce the time waste of an empty CA slot to aSlotTime so as to improve the air time efficiency.

In order to save power, a SOFDMA capable station is not necessary to wake up all the time to monitor the channel during CA-TXOP. Instead, it can sleep most of time in CA Slots which it does not transmit. According to the received legacy preamble of trigger response frame, the SOFDMA capable station can set up its wakeup timer to wake up just before the current CA slot ends so that it can start monitoring the medium and catch up the idle period between two CA slots.

Figure 7B:
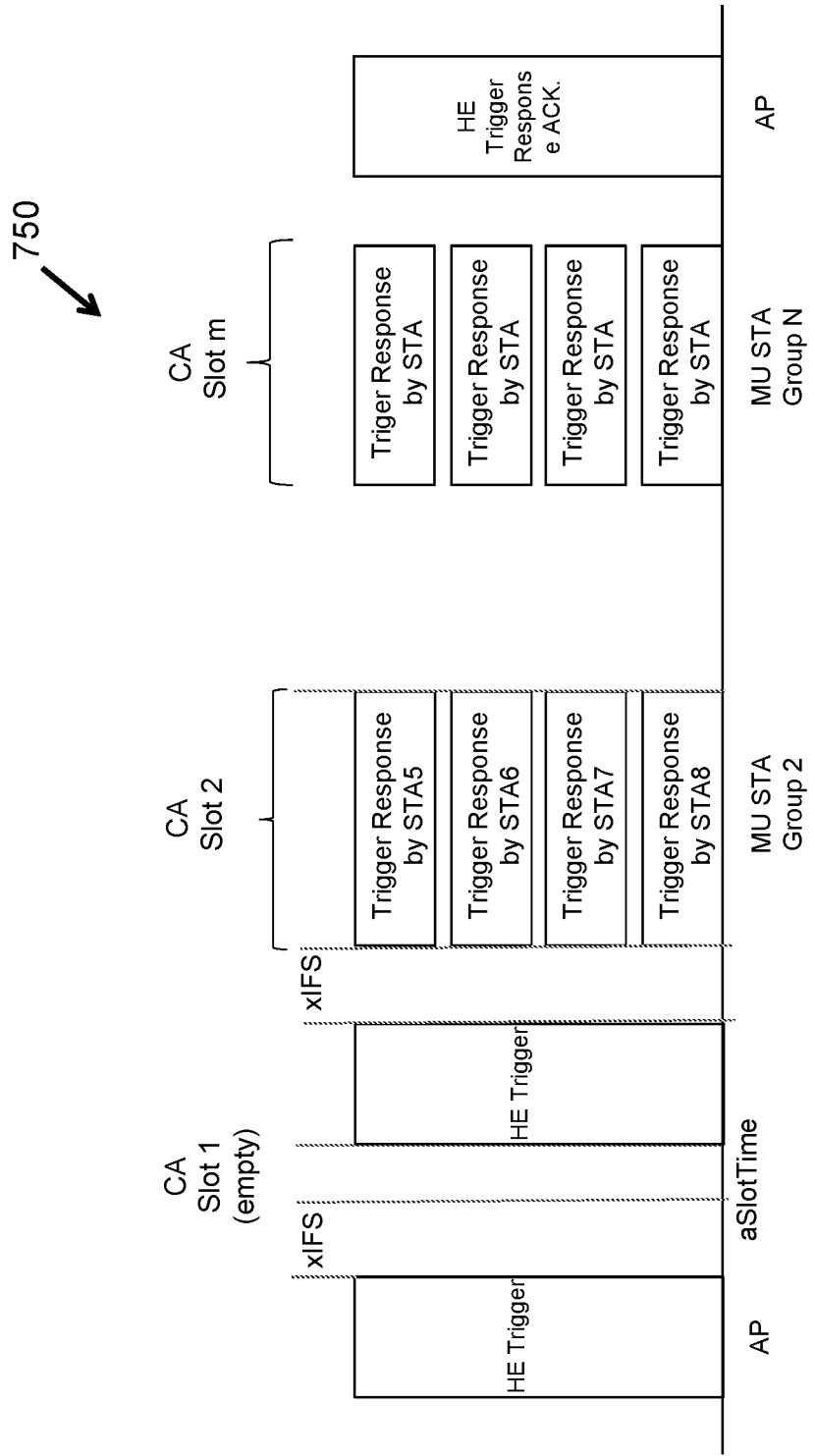

FIG. 7B shows another example 750 of early response to trigger frame.

In this approach, it is the AP that controls the early response transmission if the empty CA slot is detected. When the AP sends out a trigger frame, it switches to the receiving mode to detect the trigger response frames from SOFDMA stations. If the AP does not receive any trigger response frame in an aSlotTime after the CA slot begins, it means the current CA slot is empty and the AP may send a new trigger frame to request the next and following SOFDMA STA groups to transmit earlier based on new trigger frame, instead of waiting until the end of current CA slot duration.

In order to save the power, a SOFDMA station with its backoff counter>0 should detect the trigger response frame or a new trigger frame in aSlotTime in the CA slot. If it detects a trigger response frame sent by other SOFDMA station(s), it may go to the sleep for about CA slot time (aSlotTime) and wake up just before the current CA slot ends to continue monitoring the channel. If the SOFDMA station detects an empty CA slot, it may continue monitoring the channel for a short period of time. If a new trigger frame after aSlotTime of the beginning of empty CA slot is detected, it will decode the trigger frame and may respond the trigger frame earlier than original scheduled slot time according to the information in the new trigger frame.

Figure 8:
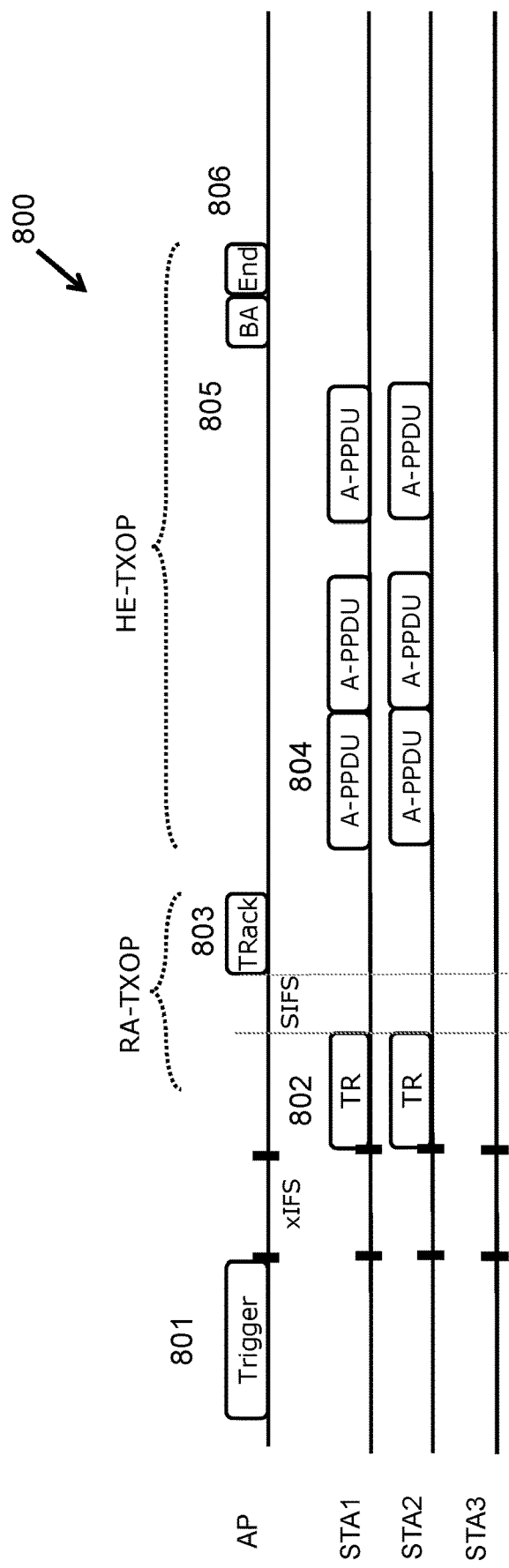
FIG. 8 shows an example of transmission in HE-TXOP.

FIG. 8 shows an example timeline of transmissions in HE-TXOP of successful trigger response stations. As seen from top to bottom of the drawing, with time increasing from left to right, the following sequence of events may take place:

801. The SOFDMA AP transmits a trigger frame indicating channel access after detecting that the medium is idle and its NAV is at "0." The SOFDMA AP sets the Duration field of the trigger frame to the time required by SOFDMA process. Legacy stations and SOFDMA stations in OBSS may use the Duration information to update their NAV values. Non-AP SOFDMA stations in the BSS use the training sequence of trigger frame to perform timing synchronization with the SOFDMA AP.

802. After xIFS time, the SOFDMA capable stations, STA1 and STA2, check their NAV values (=0) and contend the medium via SOFDMA channel access mechanism. STA1 and STA2 transmit a trigger response frame respectively at same time.

803. After detecting the legacy preamble of trigger response frames from stations STA1 and STA2, the AP responds with a trigger response acknowledgement frame (TRack) at the end of CA slots to indicate that trigger response frames were received. The AP may combine the TRack with a new trigger frame to schedule the successful trigger response stations to transmit in the next HE-TXOP immediately.

804. The station STA1 and STA2 transmit A-PPDU frames over OFDMA sub-channels at same time in HE-TXOP.

805. After receiving A-PPDU packets from STA1 and STA2, the AP sends BA to STA1 and STA2 to confirm the reception.

806. The AP may terminate the HE-TXOP via sending an implicit HE-TXOP End indication in BA frame or explicit HE-TXOP End frame. Upon the HE-TXOP being terminated, other stations that used information from TRack as the most recent basis to update their NAVs are permitted to reset their NAVs accordingly.

Figure 9:
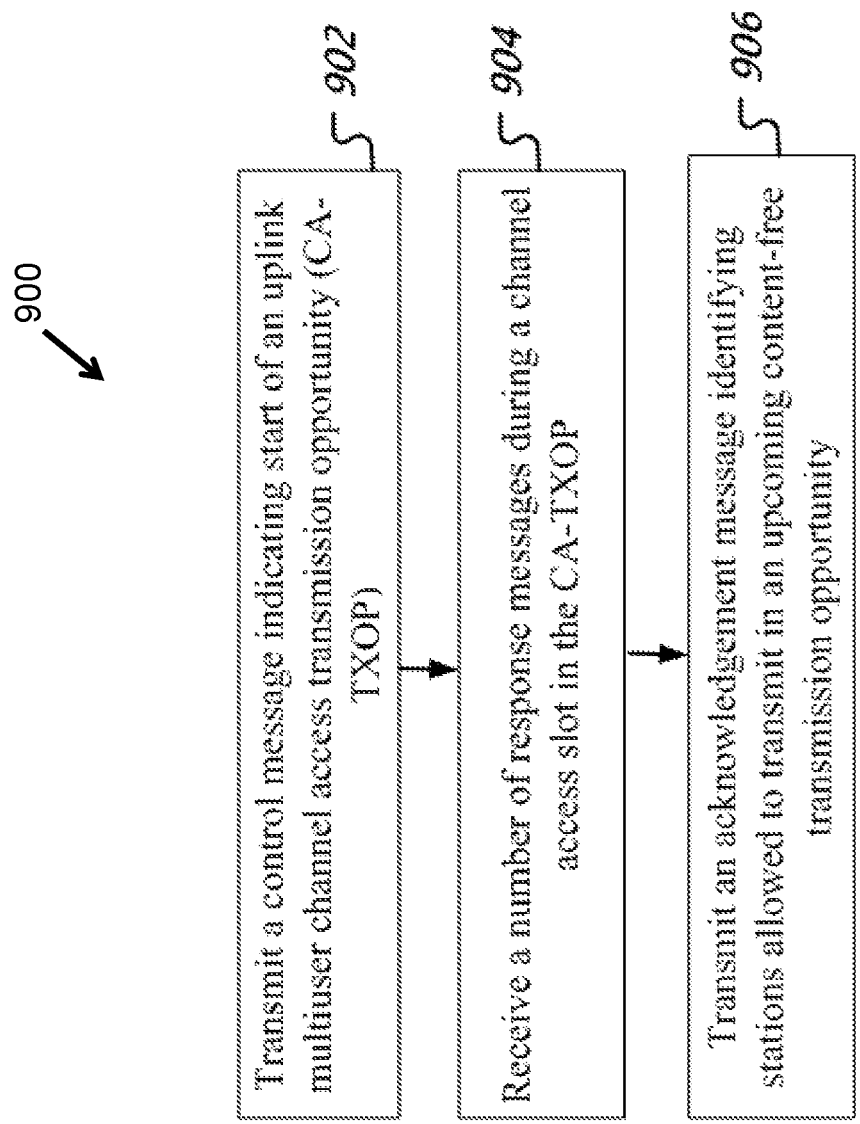
FIG. 9 shows an example method of wireless communication implemented by an access point.

FIG. 9 illustrates a flowchart for an example method 900 of controlling operation of a wireless network comprising an access point and a plurality of stations.

At 902, the method 900 includes transmitting, by the access point, a control message comprising a parameter indicating start of an uplink multiuser channel access transmission opportunity (CA-TXOP) during which multiple of the plurality of stations are permitted to attempt uplink transmissions using orthogonal frequency division multiplexing access (OFDMA). In some embodiments, the control message may identify the set of stations permitted to contend in the medium in CA-TXOP from the plurality of stations.

At 904, the method 900 includes receiving a number of response messages at a channel access slot in the CA-TXOP. In some embodiments, the response messages may be received by monitoring a wireless channel for a first legacy preamble and decoding one or more response messages over OFDMA sub-channels when the first legacy preamble is detected. As discussed with respect to FIGS. 5A and 5B, the legacy preamble may include L-STF, L-LTF and L-SIG fields.

At 906, the method 900 includes transmitting, based on identities of stations that sent the number of response messages, an acknowledgement message identifying stations allowed to transmit in the extended TXOP. In some embodiments, the acknowledgement message may be transmitted by deferring transmission of the acknowledgement message when a trigger response acknowledgement policy is set to "deferred" and combining all acknowledgements into a single message.

As described herein, the first message may include least some of the following fields: a duration of channel access transmission opportunity, a number channel access slots of CA-TXOP, a duration of each channel access slot, minimum and maximum contention windows sizes used for channel access, and a trigger response acknowledgement policy.

Figure 10:
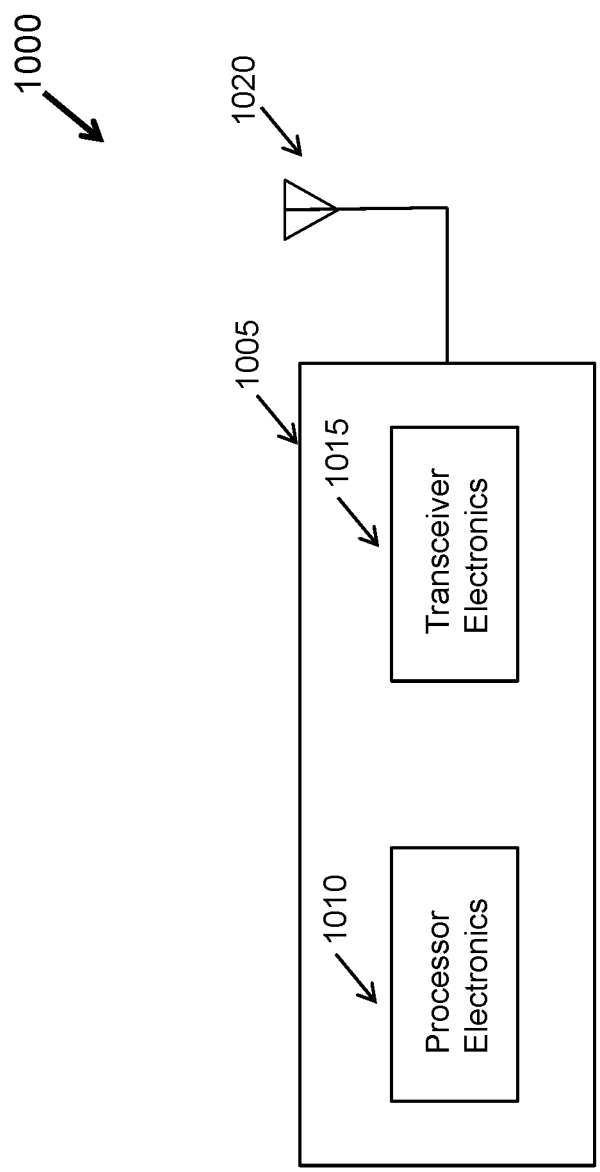
FIG. 10 shows an example wireless communication apparatus.

FIG. 10 is a block diagram representation of a portion of a radio station 1005. A radio station 1005 such as a base station or a wireless device can include processor electronics 1010 such as a microprocessor that implements one or more of the wireless techniques presented in this document. The radio station 1005 can include transceiver electronics 1015 to send and/or receive wireless signals over one or more communication interfaces such as antenna 1020. The radio station 1005 can include other communication interfaces for transmitting and receiving data. Radio station 1005 can include one or more memories configured to store information such as data and/or instructions. In some implementations, the processor electronics 1010 can include at least a portion of the transceiver electronics 1015. The radio station 1005 may be used to implement the AP-side or the STA-side techniques described in this document. Further, the processor electronics may include a memory for storing data or instructions.

Figure 11:
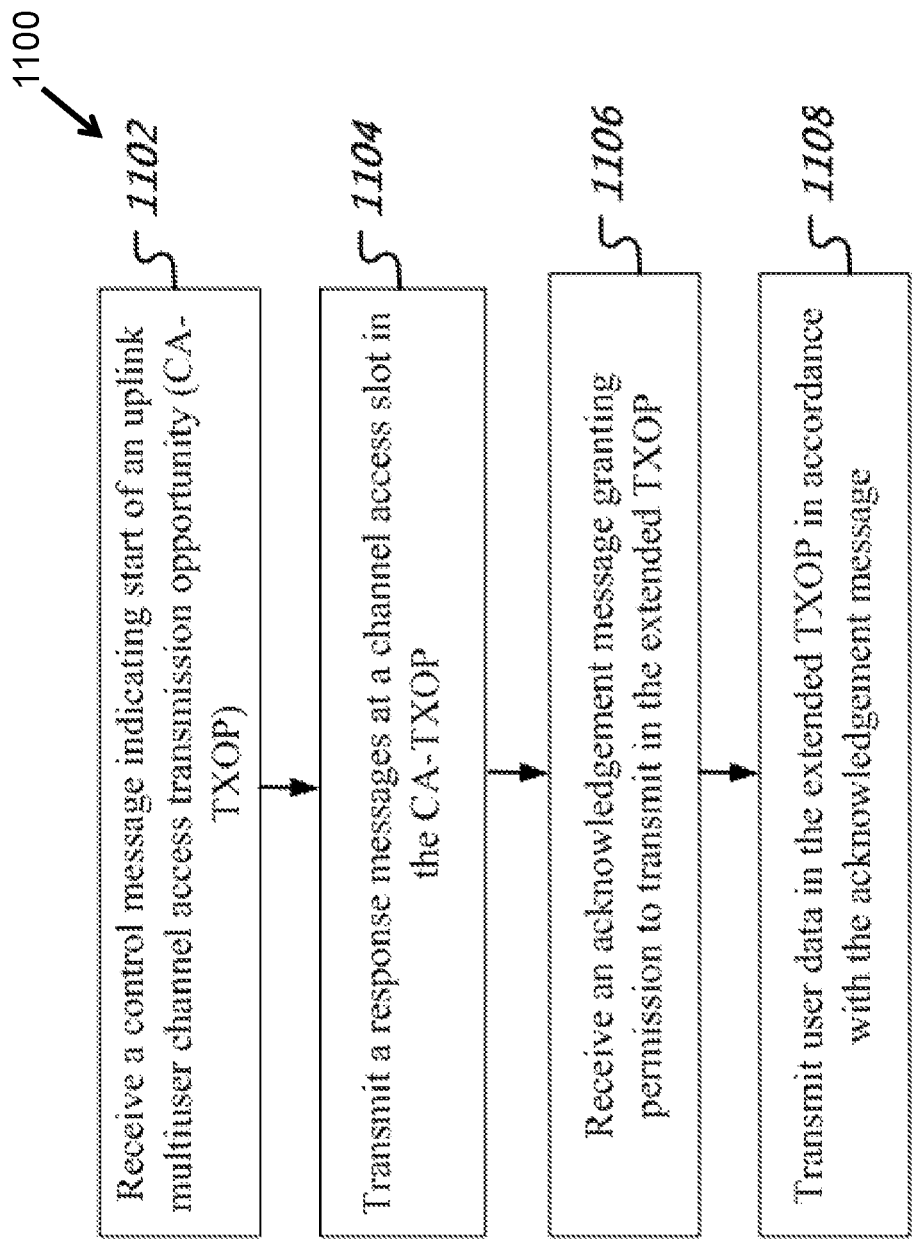
FIG. 11 shows an example method of wireless communication implemented by a wireless station.

FIG. 11 illustrates a flowchart for an example method 1100 of wireless communication. The method 1100 includes, at 1102, receiving a control message indicating start of an uplink multiuser channel access transmission opportunity (CA-TXOP). The method 1100 includes, at 1104, transmitting a response messages at a channel access slot in the CA-TXOP. The method 1100 includes, at 1106, receiving an acknowledgement message granting permission to transmit in the extended TXOP. The method 1100 includes, at 1108, transmitting user data in the extended TXOP in accordance with the acknowledgement message.

The SOFDMA capable AP may use the MU channel access Only indication (MUCAO) to control the HE stations to perform channel access via EDCA mechanism. If the AP detects the traffic load congested in its BSS, it may set MUCAO to "1" in beacon frame to disallow HE stations to use EDCA to perform channel access to the medium so as to reduce congestion. Once this indication is set, the HE STA will only perform the MU channel access through CA-TXOP specified and controlled by the trigger frame. Otherwise, the HE STA can perform channel access in either EDCA or OFDMA channel access in parallel.

It will be appreciated that techniques for managing access to a wireless communication medium are disclosed. In some embodiments, a periodic transmission opportunity is allocated to a station for its transmissions in a slotted OFDMA channel access transmission time. It will further be appreciated that techniques for using a control frame, e.g., a trigger frame are disclosed. Because a trigger frame can be transmitted at a regular time period, the use of trigger frame advantageously enables an AP to perform fast congestion control.

It will further be appreciated that techniques of performing NACK based re-transmission are disclosed. It will also be appreciated by a person of skill in the art that using the disclosed SOFDMA and existing EDCA techniques, an AP could effectively control congestion so that during the congestion, AP can disable EDCA to gain more control. The beacon frame may be used to dynamically enable or disable EDCA in the BSS.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a channel access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of controlling operation of a wireless network comprising an access point and a plurality of stations, comprising:

transmitting, by the access point, a control message comprising a parameter indicating start of an uplink multiuser channel access transmission opportunity (CA-TXOP) during which multiple of the plurality of stations are permitted to attempt uplink transmissions using orthogonal frequency division multiplexing access (OFDMA), wherein the control message includes a minimum contention window size (CWmin) and a maximum contention window size (CWmax) used for channel access, and wherein a backoff counter value of the channel access is in range [0, CW−1], where CW is initially within a range of the CWmin to the CWmax;

receiving a number of response messages from the multiple stations during a channel access slot in the uplink multiuser channel access transmission opportunity; and transmitting, based on identities of stations that sent the response messages, an acknowledgement message identifying which of the multiple stations have succeeded.

2. The method of claim 1, wherein the control message includes at least some of the following fields: a duration of the CA-TXOP, a number channel access slots, a duration of each channel access slot, and a trigger response acknowledgement policy.

3. The method of claim 1, further comprising:

switching, after transmitting the control message, to a receiving mode to detect response messages within a time period after a channel access opportunity begins, and when no response messages are detected, sending a next control message instead of waiting until end of current channel access opportunity duration.

4. The method of claim 1, further including:
changing values of the CWmin and the CWmax based on a network load condition.

5. The method of claim 1, wherein transmitting the control message includes:
identifying a set of stations from the plurality of stations that are permitted to contend in a medium in the CA-TXOP.

6. The method of claim 1, wherein receiving the number of response messages includes:
monitoring a wireless channel for a first legacy preamble; and
decoding one or more response messages transmitted over OFDMA sub-channels when the first legacy preamble is detected.

7. The method of claim 6, wherein the first legacy preamble includes legacy short training field (L-STF), legacy long training field (L-LTF) and legacy signal field (L-SIG).

8. The method of claim 1, wherein transmitting the acknowledgement message includes:
deferring transmission of the acknowledgement message when a trigger response acknowledgement policy is set to a deferred state; and
combining all acknowledgements into a single message.

9. The method of claim 1, wherein the control message is transmitted periodically or aperiodically based on an operating condition of the wireless network.

10. The method of claim 1, further comprising:
transmitting at least one channel access parameter indicative of a characteristic of the control message in a beacon frame transmission.

11. The method of claim 1, further including:
detecting collisions while receiving the number of response messages; and
transmitting an indication to increase backoff in a next channel access transmission opportunity (CA-TXOP) or a next control message transmission.

12. The method of claim 5, wherein the control message further includes a special station identifier to allow all capable stations to access to the channel access slot or a list of identifiers for one or more specified station to access to the channel access slot.

13. An apparatus for controlling operation of a wireless network comprising an access point and a plurality of stations, the apparatus comprising:
a memory that stores instructions; and
a processor that reads the instructions from the memory and implements a method of controlling operation of the wireless network, the instructions comprising:
instructions for transmitting, by the access point, a control message comprising a parameter indicating start of an uplink multiuser channel access transmission opportunity (CA-TXOP) during which multiple of the plurality of stations are permitted to attempt uplink transmissions using orthogonal frequency division multiplexing access (OFDMA),
wherein the control message includes a minimum contention window size (CWmin) and a maximum contention window size (CWmax) used for channel access, and
wherein a backoff counter value of the channel access is in range [0, CW−1], where CW is initially within a range of the CWmin to the CWmax;

instructions for receiving a number of response messages at a channel access slot in the CA-TXOP; and
instructions for transmitting, based on identities of stations that sent the number of response messages, an acknowledgement message identifying stations allowed to transmit in an extended TXOP.

14. The apparatus of claim 13, wherein the control message includes at least some of the following fields: a duration of the CA-TXOP, a number channel access slots of the CA-TXOP, a duration of each channel access slot, and a trigger response acknowledgement policy.

15. The apparatus of claim 13, wherein the instructions further include:
instructions for identifying a set of stations from the plurality of stations that are permitted to contend in the medium in the CA-TXOP.

16. The apparatus of claim 13, wherein the instructions further include:
instructions for monitoring a wireless channel for a first legacy preamble; and
instructions for decoding one or more response messages transmitted over OFDMA sub-channels when the first legacy preamble is detected.

17. The apparatus of claim 16, wherein the first legacy preamble includes legacy short training field (L-STF), legacy long training field (L-LTF) and legacy signal field (L-SIG).

18. The apparatus of claim 13, wherein the instructions further include:
instructions for deferring transmission of the acknowledgement message when a trigger response acknowledgement policy is set to a deferred state; and
instructions for combining all acknowledgements into a single message.

19. The apparatus of claim 13, wherein the instructions further include:
instructions for detecting collisions while receiving the number of response messages; and
instructions for transmitting an indication to increase backoff in a next RX-TXOP or a next control message transmission.

20. The apparatus of claim 13, wherein the instructions further include:
instructions for switching, after transmitting the control message, to a receiving mode to detect response messages within a time period after a channel access opportunity begins, and when no response messages are detected, sending a next control message instead of waiting until end of current channel access opportunity duration.

21. The apparatus of claim 15, wherein the instructions further include instructions for transmitting a special station identifier to allow all capable stations to access to the channel access slot or a list of identifiers for one or more specified station to access to the channel access slot.

22. A method of controlling operation of a wireless network comprising an access point and a plurality of wireless stations, the method comprising:
receiving, by a wireless station, a control message comprising a parameter indicating start of an uplink multiuser channel access transmission opportunity (CA-TXOP) during which multiple of the plurality of wireless stations are permitted to attempt uplink transmissions using orthogonal frequency division multiplexing access (OFDMA);

transmitting, by the wireless station, a response message at a channel access slot specified in the CA-TXOP, wherein transmitting the response message includes:
setting a backoff counter to an integer value,
decreasing the backoff counter after each CA-TXOP duration after receiving the control message, and
selectively transmitting the response message after a shortened time interval after a prior CA-TXOP designated for another wireless station when the backoff counter has reached zero and no transmission is detected in the prior CA-TXOP after a shortened time duration; and
receiving, for the response message, an acknowledgement message identifying the corresponding response transmission success.

23. The method of claim 22, wherein the control message includes at least some of the following fields: a duration of the CA-TXOP, a number channel access slots of the CA-TXOP, a duration of each channel access slot, minimum and maximum contention windows sizes used for channel access, and a trigger response acknowledgement policy.

24. The method of claim 22, further comprising:
transmitting user data in an extended TXOP in accordance with the received acknowledgement message.

25. An apparatus for controlling operation of a wireless network comprising an access point and a plurality of stations, the apparatus comprising:
a memory that stores instructions; and
a processor that reads the instructions from the memory and implements a method of controlling operation of the wireless network, the instructions comprising:
instructions for receiving, by a wireless station, a control message comprising a parameter indicating start of an uplink multiuser channel access transmission opportunity (CA-TXOP) during which multiple of the plurality of wireless stations are permitted to attempt uplink transmissions using orthogonal frequency division multiplexing access (OFDMA);
instructions for transmitting, by the wireless station, a response message at a channel access slot specified in the CA-TXOP, wherein the instructions for transmitting the response message includes:
instructions for setting a backoff counter to an integer value,
instructions for decreasing the backoff counter after each CA-TXOP duration after receiving the control message, and
instructions for selectively transmitting the response message after a shortened time interval after a prior CA-TXOP designated for another wireless station when the backoff counter has reached zero and no transmission is detected in the prior CA-TXOP after a shortened time duration;
instructions for receiving, for the response message, an acknowledgement message identifying the corresponding response received successfully; and
instructions for transmitting user data in an extended TXOP in accordance with the received acknowledgement message.

26. The apparatus of claim 25, wherein the control message includes at least some of the following fields: a duration of the CA-TXOP, a number channel access slots of the CA-TXOP, a duration of each channel access slot, minimum and maximum contention windows sizes used for channel access, and a trigger response acknowledgement policy.

27. A wireless communication network comprising an access point and multiple wireless stations,
wherein the access point stores, in a first memory, instructions causing the access point to:
transmit a control message comprising a parameter indicating start of an uplink multiuser channel access transmission opportunity (CA-TXOP) during which multiple of the plurality of stations are permitted to attempt uplink transmissions using orthogonal frequency division multiplexing access (OFDMA),
wherein the control message includes a minimum contention window size (CWmin) and a maximum contention window size (CWmax) used for channel access, and
wherein a backoff counter value of the channel access is in range [0, CW−1], where CW is initially within a range of the CWmin to the CWmax;
receive a number of response messages from the multiple stations during a channel access slot in the CA-TXOP; and
transmit, based on identities of stations that sent the response messages, an acknowledgement message identifying which of the multiple stations have succeeded and are allowed to transmit in an upcoming arbitrated contention-free transmission opportunity; and
wherein each of the plurality of wireless stations stores, in a second memory, instructions causing each of the plurality of wireless station to:
receive the control message;
transmit a corresponding response message over OFDMA sub-channel at a channel access slot specified in the CA-TXOP, wherein the transmit the corresponding response message includes:
set a backoff counter to an integer value,
decrease the backoff counter after each CA-TXOP duration after receiving the control message, and
selectively transmit the response message after a shortened time interval after a prior CA-TXOP designated for another wireless station when the backoff counter has reached zero and no transmission is detected in the prior CA-TXOP after a shortened time duration; and
receive an acknowledgement message identifying the corresponding response received successfully.

28. The wireless communication network of claim 27, wherein the control message includes at least some of the following fields: a duration of the CA-TXOP, one or more channel access slots of the CA-TXOP, a duration of each channel access slot, and a trigger response acknowledgement policy.

29. The wireless communication network of claim 27, wherein each of the plurality of wireless stations stores, in the second memory, instructions causing each of the plurality of wireless stations further to:
transmit user data in the an extended TXOP in accordance with the received acknowledgement message.

* * * * *

UNITED STATES PATENT AND TRADEMARK OFFICE
CERTIFICATE OF CORRECTION

PATENT NO. : 10,980,057 B2
APPLICATION NO. : 16/462206
DATED : April 13, 2021
INVENTOR(S) : Yonggang Fang It is certified that error appears in the above-identified patent and that said Letters Patent is hereby corrected as shown below:

On the Title Page

Item (71), under "Applicants", in Column 1, Line 2, delete "Yonggang Fang, San Diego, CA (US)".

In the Drawings

In Fig. 7B, Sheet 11 of 15, under "CA Slot m", Box 1, in Line 1, delete "Triger" and insert -- Trigger --, therefor.

In the Specification

In Column 1, Line 22, delete "(AP)" and insert -- (APs) --, therefor.

In Column 1, Line 23, delete "(STA)." and insert -- (STAs). --, therefor.

In Column 2, Line 7, delete "SOFMDA" and insert -- SOFDMA --, therefor.

In Column 6, Line 10, delete "could be" and insert -- could --, therefor.

In Column 7, Line 35, delete "access." and insert -- access; --, therefor.

In Column 9, Line 24, delete "(TA)" and insert -- (TA). --, therefor.

In Column 9, Line 28, delete "field (s):" and insert -- field(s): --, therefor.

In Column 12, Line 3, delete "an 4)" and insert -- and 4) --, therefor.

In Column 13, Line 48, delete "(RB)," and insert -- (RBs), --, therefor.

In Column 14, Line 23, delete "STA13," and insert -- STA 13, --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,980,057 B2

In Column 17, Line 15, delete "more them." and insert -- more of them. --, therefor.

In Column 18, Lines 4-5, delete "CD ROM" and insert -- CD-ROM --, therefor.

In the Claims

In Column 22, Line 60, in Claim 29, delete "the an" and insert -- an --, therefor.